(12) United States Patent
Stark et al.

(10) Patent No.: US 9,945,943 B2
(45) Date of Patent: *Apr. 17, 2018

(54) ADAPTIVE TRANSMISSION AND INTERFERENCE CANCELLATION FOR MIMO RADAR

(71) Applicant: UHNDER, INC., Austin, TX (US)

(72) Inventors: Wayne E. Stark, Ann Arbor, MI (US);
Jean P. Bordes, St. Charles, MO (US);
Curtis Davis, St. Louis, MO (US);
Raghunath K. Rao, Austin, TX (US);
Monier Maher, St. Louis, MO (US);
Manju Hegde, St. Louis, MO (US);
Otto A. Schmid, Morgantown, WV (US)

(73) Assignee: Uhnder, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/632,754

(22) Filed: Jun. 26, 2017

(65) Prior Publication Data
US 2017/0293027 A1  Oct. 12, 2017

Related U.S. Application Data

(63) Continuation of application No. 15/481,648, filed on Apr. 7, 2017, now Pat. No. 9,689,967.
(Continued)

(51) Int. Cl.
*G01S 13/93* (2006.01)
*G01S 7/02* (2006.01)
(Continued)

(52) U.S. Cl.
CPC ............ *G01S 13/93* (2013.01); *G01S 7/023* (2013.01); *G01S 7/292* (2013.01); *G01S 7/4021* (2013.01);
(Continued)

(58) Field of Classification Search
CPC .................... G01S 13/93; G01S 7/023
(Continued)

(56) References Cited

U.S. PATENT DOCUMENTS 1,882,128 A   10/1932  Fearing
3,374,478 A    3/1968  Blau
(Continued)

FOREIGN PATENT DOCUMENTS

EP    0725480    11/2011
EP    2374217     4/2013
(Continued)

OTHER PUBLICATIONS

Chambers et al., "An article entitled Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.
(Continued)

*Primary Examiner* — Marcus E Windrich
(74) *Attorney, Agent, or Firm* — Gardner, Linn, Burkhart & Ondesma, LLP

(57) ABSTRACT

A radar system has different modes of operation. In one mode the radar operates as a single-input, multiple-output (SIMO) radar system utilizing one transmitted signal from one antenna at a time. Codes with known excellent auto-correlation properties are utilized in this mode. At each receiver the response after correlating with various possible transmitted signals is measured in order to estimate the interference that each transmitter will represent at each receiver. The estimated effect of the interference from one transmitter on a receiver that correlates with a different code is used to mitigate the interference. In another mode, the radar operates as a MIMO radar system utilizing all the
(Continued)

antennas at a time. Interference cancellation of the non-ideal cross correlation sidelobes when transmitting in the MIMO mode are employed to remove ghost targets due to unwanted sidelobes.

30 Claims, 27 Drawing Sheets

Related U.S. Application Data

(60) Provisional application No. 62/327,003, filed on Apr. 25, 2016, provisional application No. 62/319,613, filed on Apr. 7, 2016.

(51) Int. Cl.
  *H04B 17/345* (2015.01)
  *H04L 27/227* (2006.01)
  *G01S 7/292* (2006.01)
  *G01S 7/40* (2006.01)
  *H04B 17/309* (2015.01)
  *H04B 7/0413* (2017.01)

(52) U.S. Cl.
  CPC ......... *H04B 7/0413* (2013.01); *H04B 17/309* (2015.01); *H04B 17/345* (2015.01); *H04L 27/2278* (2013.01)

(58) Field of Classification Search
  USPC .............................................. 342/70–72, 159
  See application file for complete search history.

(56) References Cited

U.S. PATENT DOCUMENTS

| | | |
|---|---|---|
| 3,735,395 A | 5/1973 | Ross |
| 3,750,169 A | 7/1973 | Strenglein |
| 3,896,434 A | 7/1975 | Sirven |
| 4,078,234 A | 3/1978 | Fishbein et al. |
| 4,176,351 A | 11/1979 | De Vita et al. |
| 4,566,010 A | 1/1986 | Collins |
| 4,939,685 A | 7/1990 | Feintuch |
| 5,001,486 A | 3/1991 | Bächtiger |
| 5,034,906 A | 7/1991 | Chang |
| 5,087,918 A | 2/1992 | May et al. |
| 5,151,702 A | 9/1992 | Urkowitz |
| 5,175,710 A | 12/1992 | Hutson |
| 5,218,619 A | 6/1993 | Dent |
| 5,280,288 A | 1/1994 | Sherry et al. |
| 5,302,956 A | 4/1994 | Asbury et al. |
| 5,341,141 A | 8/1994 | Frazier et al. |
| 5,345,470 A | 9/1994 | Alexander |
| 5,379,322 A | 1/1995 | Kosaka et al. |
| 5,508,706 A | 4/1996 | Tsou et al. |
| 5,657,023 A | 8/1997 | Lewis et al. |
| 5,712,640 A | 1/1998 | Andou |
| 5,724,041 A | 3/1998 | Inoue et al. |
| 5,892,477 A | 4/1999 | Wehling |
| 5,917,430 A | 6/1999 | Greneker, III et al. |
| 5,920,285 A | 7/1999 | Benjamin |
| 5,931,893 A | 8/1999 | Dent et al. |
| 5,959,571 A | 9/1999 | Aoyagi et al. |
| 5,970,400 A | 10/1999 | Dwyer |
| 6,067,314 A | 5/2000 | Azuma |
| 6,069,581 A | 5/2000 | Bell et al. |
| 6,121,872 A | 9/2000 | Weishaupt |
| 6,121,918 A | 9/2000 | Tullsson |
| 6,151,366 A | 11/2000 | Yip |
| 6,163,252 A | 12/2000 | Nishiwaki |
| 6,184,829 B1 | 2/2001 | Stilp |
| 6,191,726 B1 | 2/2001 | Tullsson |
| 6,288,672 B1 | 9/2001 | Asano et al. |
| 6,307,622 B1 | 10/2001 | Lewis |
| 6,347,264 B2 | 2/2002 | Nicosia et al. |
| 6,400,308 B1 | 6/2002 | Bell et al. |
| 6,411,250 B1 | 6/2002 | Oswald et al. |
| 6,417,796 B1 | 7/2002 | Bowlds |
| 6,583,753 B1 | 6/2003 | Reed |
| 6,614,387 B1 | 9/2003 | Deadman |
| 6,624,784 B1 | 9/2003 | Yamaguchi |
| 6,674,908 B1 | 1/2004 | Aronov |
| 6,714,956 B1 | 3/2004 | Liu et al. |
| 6,747,595 B2 | 6/2004 | Hirabe |
| 6,768,391 B1 | 7/2004 | Dent et al. |
| 6,975,246 B1 | 12/2005 | Trudeau |
| 7,119,739 B1 | 10/2006 | Struckman |
| 7,289,058 B2 | 10/2007 | Shima |
| 7,299,251 B2 | 11/2007 | Skidmore et al. |
| 7,338,450 B2 | 3/2008 | Kristofferson et al. |
| 7,395,084 B2 * | 7/2008 | Anttila .................... H01Q 1/28 342/417 |
| 7,460,055 B2 | 12/2008 | Nishijima et al. |
| 7,545,310 B2 | 6/2009 | Matsuoka |
| 7,545,321 B2 | 6/2009 | Kawasaki |
| 7,564,400 B2 | 7/2009 | Fukud |
| 7,567,204 B2 | 7/2009 | Sakamoto |
| 7,609,198 B2 | 10/2009 | Chang |
| 7,642,952 B2 | 1/2010 | Fukuda |
| 7,663,533 B2 | 2/2010 | Toennesen |
| 7,728,762 B2 | 6/2010 | Sakamoto |
| 7,791,528 B2 | 9/2010 | Klotzbuecher |
| 7,847,731 B2 | 12/2010 | Wiesbeck et al. |
| 7,855,677 B2 | 12/2010 | Negoro et al. |
| 7,859,450 B2 | 12/2010 | Shirakawa et al. |
| 8,019,352 B2 | 9/2011 | Rappaport et al. |
| 8,049,663 B2 | 11/2011 | Frank et al. |
| 8,059,026 B1 | 11/2011 | Nunez |
| 8,102,306 B2 | 1/2012 | Smith, Jr. et al. |
| 8,154,436 B2 | 4/2012 | Szajnowski |
| 8,330,650 B2 | 12/2012 | Goldman |
| 8,390,507 B2 | 3/2013 | Wintermantel |
| 8,471,760 B2 * | 6/2013 | Szajnowski ............. G01S 7/023 342/104 |
| 8,532,159 B2 | 9/2013 | Kagawa et al. |
| 8,547,988 B2 | 10/2013 | Hadani et al. |
| 8,686,894 B2 | 4/2014 | Fukuda et al. |
| 8,694,306 B1 | 4/2014 | Short et al. |
| 9,121,943 B2 | 9/2015 | Stirlin-Gallacher et al. |
| 9,239,378 B2 * | 1/2016 | Kishigami ............... G01S 7/023 |
| 9,239,379 B2 | 1/2016 | Burgio et al. |
| 9,282,945 B2 | 3/2016 | Smith et al. |
| 9,335,402 B2 | 5/2016 | Maeno et al. |
| 9,541,639 B2 | 1/2017 | Searcy et al. |
| 9,568,600 B2 | 2/2017 | Alland |
| 9,575,160 B1 | 2/2017 | Davis et al. |
| 9,599,702 B1 | 3/2017 | Bordes et al. |
| 9,689,967 B1 | 6/2017 | Stark et al. |
| 9,772,397 B1 | 9/2017 | Bordes et al. |
| 9,791,551 B1 | 10/2017 | Eshraghi et al. |
| 9,791,564 B1 | 10/2017 | Harris et al. |
| 9,806,914 B1 | 10/2017 | Bordes et al. |
| 9,829,567 B1 | 11/2017 | Davis et al. |
| 2001/0002919 A1 | 6/2001 | Sourour et al. |
| 2002/0004692 A1 | 1/2002 | Nicosia et al. |
| 2002/0044082 A1 | 4/2002 | Woodington et al. |
| 2002/0075178 A1 | 6/2002 | Woodington et al. |
| 2002/0118522 A1 | 8/2002 | Ho et al. |
| 2002/0130811 A1 * | 9/2002 | Voigtlaender ........... G01S 7/023 342/159 |
| 2002/0147534 A1 | 10/2002 | Delcheccolo et al. |
| 2002/0155811 A1 | 10/2002 | Prismantas |
| 2003/0001772 A1 | 1/2003 | Woodington et al. |
| 2003/0011519 A1 | 1/2003 | Breglia et al. |
| 2003/0058166 A1 | 3/2003 | Hirabe |
| 2003/0102997 A1 | 6/2003 | Levin et al. |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1 | 4/2004 | Richter |
| 2004/0138802 A1 | 7/2004 | Kuragaki et al. |
| 2005/0069162 A1 | 3/2005 | Haykin |
| 2005/0156780 A1 | 7/2005 | Bonthron et al. |
| 2005/0201457 A1 | 9/2005 | Allred et al. |

(56) References Cited

U.S. PATENT DOCUMENTS

| | | |
|---|---|---|
| 2005/0225476 A1 | 10/2005 | Hoetzel et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0262007 A1* | 11/2006 | Bonthron ............... G01S 13/34 342/70 |
| 2006/0262009 A1* | 11/2006 | Watanabe ............... G01S 7/36 342/159 |
| 2007/0018884 A1 | 1/2007 | Adams |
| 2007/0018886 A1 | 1/2007 | Watanabe et al. |
| 2007/0109175 A1 | 5/2007 | Fukuda |
| 2007/0120731 A1 | 5/2007 | Kelly, Jr. et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1* | 7/2007 | Nakano ............... G01S 7/023 342/91 |
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1* | 8/2007 | Okai ............... G01S 7/023 342/70 |
| 2007/0279303 A1 | 12/2007 | Schoebel |
| 2008/0208472 A1 | 8/2008 | Morcom |
| 2008/0272955 A1 | 11/2008 | Yonak et al. |
| 2009/0015459 A1 | 1/2009 | Mahler et al. |
| 2009/0015464 A1 | 1/2009 | Fukuda |
| 2009/0051581 A1 | 2/2009 | Hatono |
| 2009/0073025 A1 | 3/2009 | Inoue et al. |
| 2009/0079617 A1 | 3/2009 | Shirakawa et al. |
| 2009/0085827 A1 | 4/2009 | Orime et al. |
| 2009/0121918 A1* | 5/2009 | Shirai ............... G01S 7/023 342/159 |
| 2009/0212998 A1 | 8/2009 | Szajnowski |
| 2009/0237293 A1 | 9/2009 | Sakuma |
| 2009/0267822 A1 | 10/2009 | Shinoda et al. |
| 2009/0289831 A1 | 11/2009 | Akita |
| 2009/0295623 A1 | 12/2009 | Falk |
| 2010/0116365 A1 | 5/2010 | McCarty |
| 2010/0156690 A1 | 6/2010 | Kim et al. |
| 2010/0198513 A1 | 8/2010 | Zeng et al. |
| 2010/0277359 A1 | 11/2010 | Ando |
| 2011/0006944 A1 | 1/2011 | Goldman |
| 2011/0032138 A1 | 2/2011 | Krapf |
| 2011/0187600 A1 | 8/2011 | Landt |
| 2011/0196568 A1 | 8/2011 | Nickolaou |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2012/0001791 A1 | 1/2012 | Wintermantel |
| 2012/0050093 A1 | 3/2012 | Heilmann et al. |
| 2012/0112957 A1 | 5/2012 | Nguyen et al. |
| 2012/0133547 A1 | 5/2012 | MacDonald et al. |
| 2012/0173246 A1 | 7/2012 | Choi et al. |
| 2012/0257643 A1 | 10/2012 | Wu et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0069818 A1 | 3/2013 | Shirakawa et al. |
| 2013/0102254 A1 | 4/2013 | Cyzs |
| 2013/0113653 A1 | 5/2013 | Kishigami et al. |
| 2013/0135140 A1* | 5/2013 | Kishigami ............... G01S 7/282 342/189 |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0070985 A1 | 3/2014 | Vacanti |
| 2014/0085128 A1 | 3/2014 | Kishigami et al. |
| 2014/0111372 A1 | 4/2014 | Wu |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0285373 A1 | 9/2014 | Kuwahara et al. |
| 2014/0327566 A1 | 11/2014 | Burgio et al. |
| 2014/0348253 A1 | 11/2014 | Mobasher et al. |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1* | 3/2015 | Kishigami ............... G01S 7/2813 342/147 |
| 2015/0103745 A1 | 4/2015 | Negus et al. |
| 2015/0198709 A1* | 7/2015 | Inoue ............... G01S 13/28 342/147 |
| 2015/0204966 A1 | 7/2015 | Kishigami |
| 2015/0204971 A1 | 7/2015 | Kuehnle |
| 2015/0204972 A1* | 7/2015 | Kuehnle ............... G01S 13/931 342/156 |
| 2015/0226848 A1 | 8/2015 | Park |
| 2015/0234045 A1 | 8/2015 | Rosenblum |
| 2015/0247924 A1 | 9/2015 | Kishigami |
| 2015/0301172 A1 | 10/2015 | Ossowska |
| 2015/0323660 A1 | 11/2015 | Hampikian |
| 2015/0331090 A1 | 11/2015 | Jeong et al. |
| 2016/0003939 A1 | 1/2016 | Stainvas et al. |
| 2016/0018511 A1 | 1/2016 | Nayyar et al. |
| 2016/0033631 A1 | 2/2016 | Searcy et al. |
| 2016/0041260 A1 | 2/2016 | Cao et al. |
| 2016/0061935 A1 | 3/2016 | McCloskey et al. |
| 2016/0084941 A1 | 3/2016 | Hassan |
| 2016/0084943 A1 | 3/2016 | Arage |
| 2016/0139254 A1 | 5/2016 | Wittenberg |
| 2016/0238694 A1* | 8/2016 | Kishigami ............... G01S 7/023 |
| 2017/0023661 A1 | 1/2017 | Richert |

FOREIGN PATENT DOCUMENTS

| | | |
|---|---|---|
| EP | 2821808 | 7/2015 |
| FR | 2751086 | 1/1998 |
| WO | WO2015175078 | 11/2015 |
| WO | WO2015185058 | 12/2015 |
| WO | WO2016/011407 | 1/2016 |
| WO | WO2016030656 | 3/2016 |
| WO | WO2017175190 | 10/2017 |
| WO | WO2017187242 | 11/2017 |
| WO | WO2017187243 | 11/2017 |
| WO | WO2017187278 | 11/2017 |
| WO | WO2017187299 | 11/2017 |
| WO | WO2017187304 | 11/2017 |
| WO | WO2017187306 | 11/2017 |
| WO | WO2017187330 | 11/2017 |
| WO | WO2017187331 | 11/2017 |
| WO | WO2017187337 | 11/2017 |
| WO | WO2017187339 | 11/2017 |
| WO | WO2017187341 | 11/2017 |

OTHER PUBLICATIONS

Fraser, "Design and simulation of a coded sequence ground penetrating radar," In: Diss. University of British Columbia, Dec. 3, 2015.

(56) References Cited

OTHER PUBLICATIONS

Zhou et al., "Linear extractors for extracting randomness from noisy sources," In: Information Theory Proceedings (ISIT), 2011 IEEE International Symposium on Oct. 3, 2011.

* cited by examiner

ADAPTIVE TRANSMISSION AND INTERFERENCE CANCELLATION FOR MIMO RADAR

CROSS REFERENCE TO RELATED APPLICATIONS

This application is a continuation of U.S. patent application Ser. No. 15/481,648, filed Apr. 7, 2017, now U.S. Pat. No. 9,689,967, which claims the filing benefits of U.S. provisional applications, Ser. No. 62/319,613, filed Apr. 7, 2016, and Ser. No. 62/327,003, filed Apr. 25, 2016, which are hereby incorporated by reference herein in their entireties.

FIELD OF THE INVENTION

The present invention is directed to radar systems, and in particular to radar systems for vehicles.

BACKGROUND OF THE INVENTION

The use of radar to determine range, velocity, and angle (elevation or azimuth) of objects in an environment is important in a number of applications including automotive radar and gesture detection. A radar typically transmits a radio frequency (RF) signal and listens for the reflection of the radio signal from objects in the environment. A radar system estimates the location and velocity of objects, also called targets, in the environment by comparing the received radio signal with the transmitted radio signal. A radar system with multiple transmitters and multiple receivers can also determine the angular position of a target in the environment. Each receiver can compare a received signal with each of the possible transmitted signals. Because the received signal contains signals from various transmitters, a receiver attempting to determine the time delay from one transmitter will have interference from other transmitters.

SUMMARY OF THE INVENTION

The present invention provides methods and a radar system using multiple transmitters and multiple receivers that can mitigate the self-interference present from the multiple transmitters. The self-interference can mask out targets at a further distance than other near targets because of imperfect correlation functions. The sidelobes of the spreading codes used in phase modulated continuous wave (PMCW) radar system can have imperfect cross correlation values that result in near targets masking out far targets. The present invention provides methods and techniques for reducing the effect of the self-interference.

A radar sensing system for a vehicle in accordance with an embodiment of the present invention includes at least one transmitter, at least one receiver, at least one antenna, memory, and a control processor. The at least one transmitter is configured for installation and use on a vehicle and transmits a radio frequency (RF) signal. The at least one transmitter is further operable to transmit an RF signal. The transmitted RF signal is generated by up-converting a baseband transmitted signal. The at least one receiver is configured for installation and use on the vehicle and receives a reflected RF signal. The reflected RF signal is the transmitted RF signal reflected from an object or multiple objects. In each receiver of the at least one receiver, the reflected RF signal is down-converted, and then sampled and quantized using an analog-to-digital converter (ADC) to produce possibly complex baseband samples. The resulting signal from the ADC is processed by a digital processor. A control unit is employed to change the characteristics of the transmitted signal and in the way the receiver processes the reflected RF signal to generate estimates of range, velocity, and angle of objects in the environment.

A radar sensing system for a vehicle in accordance with another embodiment of the present invention includes a plurality of transmitters, a plurality of receivers, and a controller. The plurality of transmitters are configured for installation and use on a vehicle, and further configured to transmit radio signals. The plurality of receivers are configured for installation and use on the vehicle, and further configured to receive radio signals that include the transmitted radio signals reflected from objects in the environment. The controller is configured to allow, during a first operational mode, a first transmitter of the plurality of transmitters to transmit and to stop the remaining transmitters of the plurality of transmitters from transmitting. The radio signals transmitted from just the first transmitter are received by each receiver of the plurality of receivers. During the first operational mode, each receiver of the plurality of receivers is configured to correlate the received radio signals that are received to estimate interference that the first transmitter, while transmitting alone, will represent at each receiver of the plurality of receivers. During the first operational mode, the processor is further configured to allow a second transmitter of the plurality of transmitters to transmit and to stop the remaining transmitters of the plurality of transmitters from transmitting. The radio signals transmitted from just the second transmitter are received by each receiver of the plurality of receivers. During the first operational mode, each receiver of the plurality of receivers is further configured to correlate the received radio signals that are received to estimate interference that the second transmitter, while transmitting alone, will represent at each receiver of the plurality of receivers. The processor is configured to allow, during a second operational mode, each transmitter of the plurality of transmitters to transmit radio signals, such that each receiver of the plurality of receivers receives transmitted radio signals reflected from objects in the environment that are transmitted from at least two transmitters of the plurality of transmitters, and the plurality of receivers are each further configured to mitigate interference that is due to other transmitters of the plurality of transmitters. The mitigated interference is based upon the estimated interference due to the transmitters.

A method for measuring interference in a multiple-input, multiple-output (MIMO) radar system in a vehicle in accordance with another embodiment of the present invention includes providing a MIMO radar sensing system comprising at least two transmitters configured for installation and use on a vehicle and configured to transmit radio signals, and at least two receivers configured for installation and use on the vehicle and configured to receive radio signals that are the transmitted radio signals reflected from objects in the environment. In a first mode of operation, each transmitter of the at least two transmitters is exclusively transmitting in turn for a separate period of time. In the first mode of operation, radio signals transmitted from the at least two transmitters are also received. The radio signals are received from only one transmitter at a time. In the first mode of operation, each receiver of the at least two receivers, correlates the received signals to estimate interference due to particular transmitters at each receiver of the at least two receivers. In a second mode of operation, each transmitter of the at least two transmitters transmits radio signals simultaneously such that each receiver of the at least two receivers receives transmitted radio signals reflected from objects in the environment that are transmitted from at least two transmitters of the at least two transmitters. In the second mode of operation, each receiver of the at least two receivers mitigates the estimated interference that is due to other transmitters. Each receiver of the at least two receivers is paired with a particular transmitter of the at least two transmitters.

These and other objects, advantages, purposes and features of the present invention will become apparent upon review of the following specification in conjunction with the drawings.

DESCRIPTION OF THE PREFERRED EMBODIMENTS

The present invention will now be described with reference to the accompanying figures, wherein numbered elements in the following written description correspond to like-numbered elements in the figures. Methods and systems of the present invention may achieve better performance from a radar system when there is a near object and a far object. Exemplary embodiments of the present invention accomplish better performance by adjusting the radar system to the environment, the objective and inputs external to the radar system. The invention accomplishes better performance by adapting the radar system under software control.

The radar sensing system of the present invention may utilize aspects of the radar systems described in U.S. Pat. Nos. 9,575,160 and/or 9,599,702, and/or U.S. patent application Ser. No. 15/416,219, filed Jan. 26, 2017, and/or Ser. No. 15/292,755, filed Oct. 13, 2016, and/or U.S. provisional applications, Ser. No. 62/382,857, filed Sep. 2, 2016, Ser. No. 62/381,808, filed Aug. 31, 2016, Ser. No. 62/327,004, filed Apr. 25, 2016, Ser. No. 62/327,006, filed Apr. 25, 2016, Ser. No. 62/327,015, filed Apr. 25, 2016, Ser. No. 62/327,016, filed Apr. 25, 2016, Ser. No. 62/327,017, filed Apr. 25, 2016, and/or Ser. No. 62/327,018, filed Apr. 25, 2016, which are all hereby incorporated by reference herein in their entireties.

Figure 1:
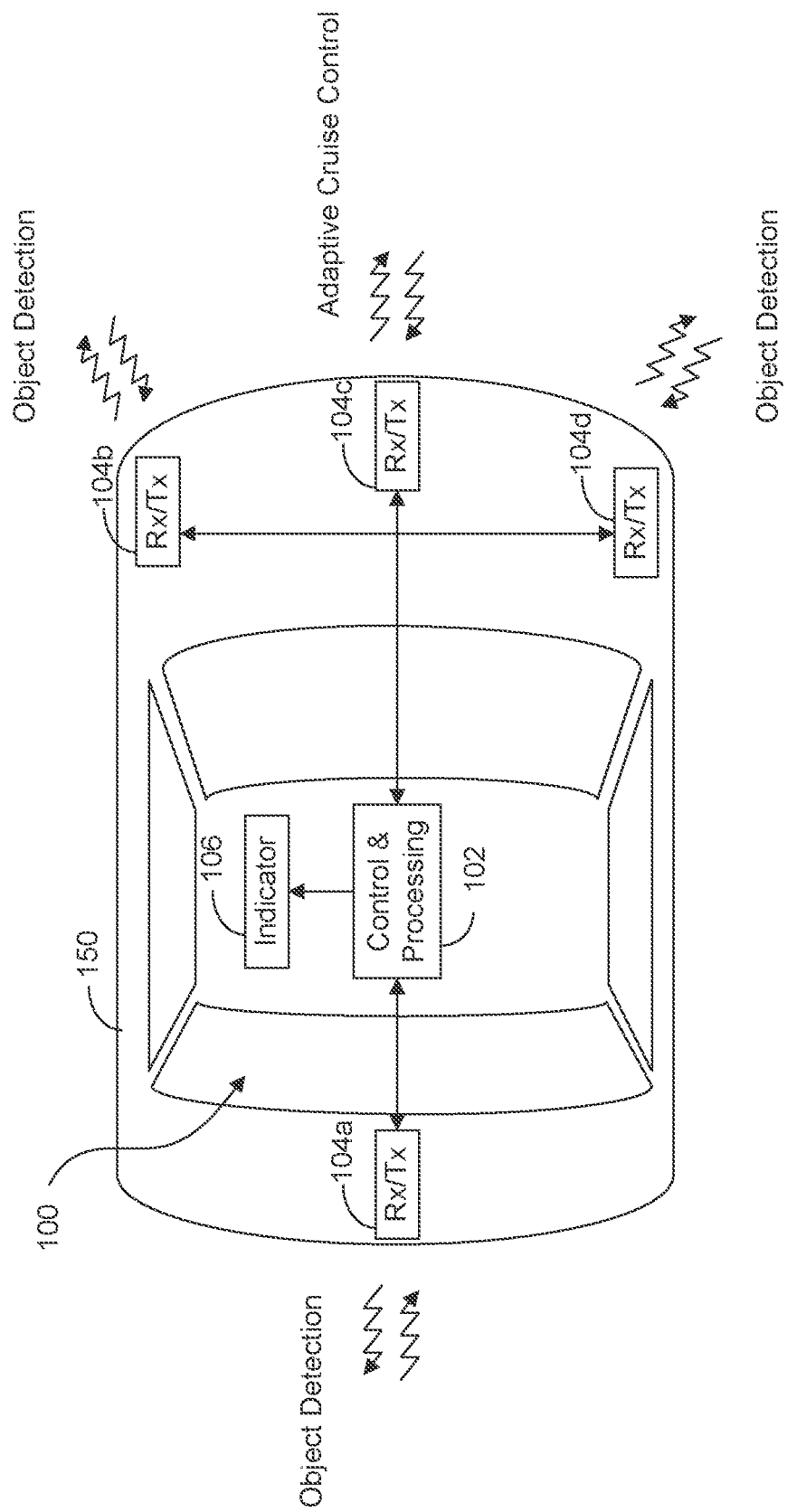
FIG. 1 is a plan view of an automobile equipped with a radar system in accordance with the present invention.

As illustrated in FIG. 1, there may be multiple radars (e.g., 104a-104d) embedded into an automobile. Each of these could employ the ideas contained in the present invention. FIG. 1 illustrates an exemplary radar system 100 configured for use in a vehicle 150. In an aspect of the present invention, a vehicle 150 may be an automobile, truck, or bus, etc. As illustrated in FIG. 1, the radar system 100 may comprise one or more transmitters and one or more virtual receivers 104a-104d, control and processing module 102 and indicator 106. Other configurations are also possible. FIG. 1 illustrates receivers/transmitters 104a-104d placed to acquire and provide data for object detection and adaptive cruise control. The radar system 100 (providing such object detection and adaptive cruise control or the like) may be part of an Advanced Driver Assistance System (ADAS) for the automobile 150.

A radar system operates by transmitting a signal and then listening for the reflection of that signal from objects in the environment. By comparing the transmitted signal and the received signal, estimates of the range to different objects, the velocity of different objects and the angle (azimuth and/or elevation) can be estimated.

There are several different types of signals that transmitters in radar systems employ. A radar system may transmit a continuous signal or a pulsed signal. In a pulsed radar system the signal is transmitted for a short time and then no signal is transmitted. This is repeated over and over. When the signal is not being transmitted the receiver listens for echoes or reflections from objects in the environment. Often a single antenna is used for both the transmitter and receiver and the radar transmits on the antenna and then listens to the received signal on the same antenna. This process is then repeated. In a continuous wave radar system the signal is continuously transmitted. There may be an antenna for transmitting and a separate antenna for receiving. One type of continuous wave radar signal is known as frequency modulated continuous wave (FMCW) radar signal. In FMCW the transmitted signal is a sinusoidal signal with varying frequency. By measuring the time difference between when a certain frequency was transmitted and when the received signal contained that frequency the range to an object can be determined.

A second type of continuous wave signal used in radar systems is a phase modulated continuous wave (PMCW) signal. In this type of radar system, the transmitted signal is a sinusoidal signal in which the phase of the sinusoidal signal varies. Typically, the phase during a given time period (called a chip period or chip duration) is one of a finite number of possible phases. A spreading code consisting of sequence of chips, (e.g., +1, +1, −1, +1, −1, . . . ) that is mapped (e.g., +1→0, −1→π) into a sequence of phases (e.g., 0, 0, π, 0, π, . . . ) that is used to modulate a carrier to generate the radio frequency (RF) signal. The spreading code could be a periodic sequence or could be a pseudo-random sequence with a very large period so it appears to be a nearly random sequence. The spreading code could be a binary code (e.g., +1 or −1). The resulting signal has a bandwidth that is proportional to the rate at which the phases change, called the chip rate, which is the inverse of the chip duration. By comparing the return signal to the transmitted signal the receiver can determine the range and the velocity of reflected objects.

Figure 2A:
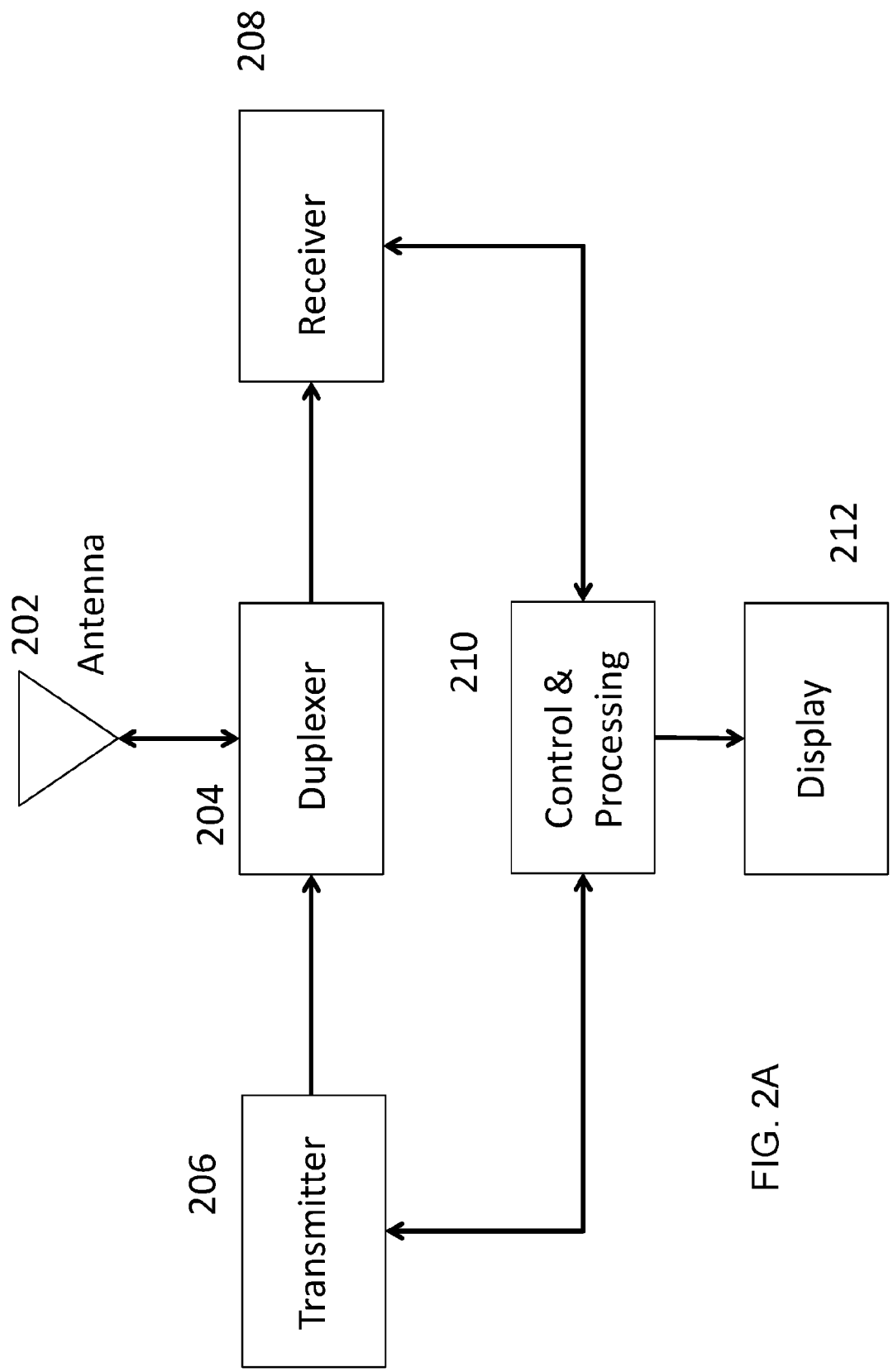
FIGS. 2A and 2B are block diagrams of single transmitter and receiver in a radar system.
Figure 2B:
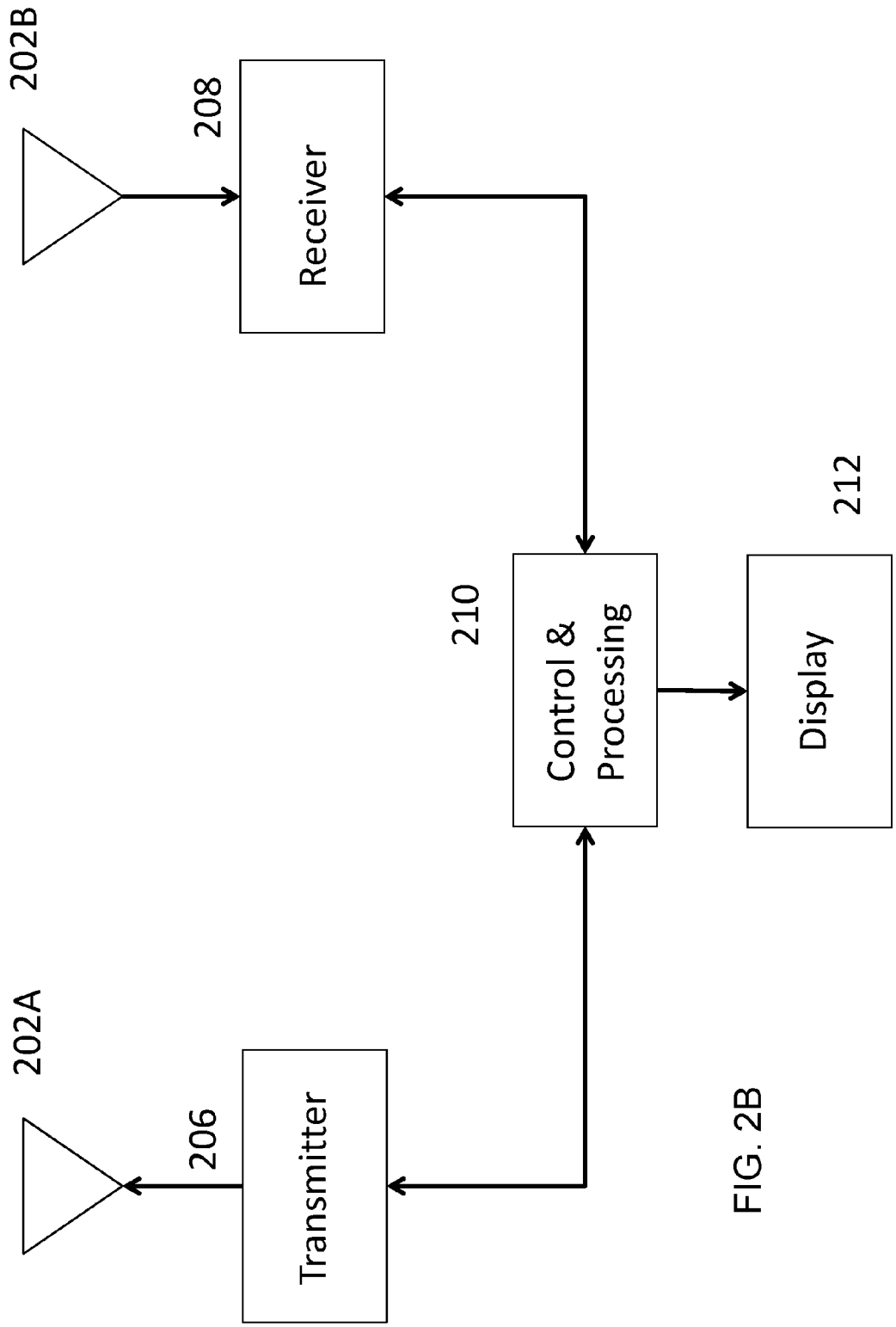

There are several ways to implement a radar system. One way, shown in FIG. 2A uses a single antenna 202 for transmitting and receiving. The antenna is connected to a duplexer 204 that routes the appropriate signal from the antenna to the receiver (208) or routes the signal from the transmitter 206 to the antenna 202. A control processor 210 controls the operation of the transmitter and receiver and estimates the range and velocity of objects in the environment. A second way to implement a radar system is shown in FIG. 2B. In this system there are separate antennas for transmitting (202A) and receiving (202B). A control processor 210 performs the same basic functions as in FIG. 2A. In each case there may be a display to visualize the location of objects in the environment.

Figure 3:
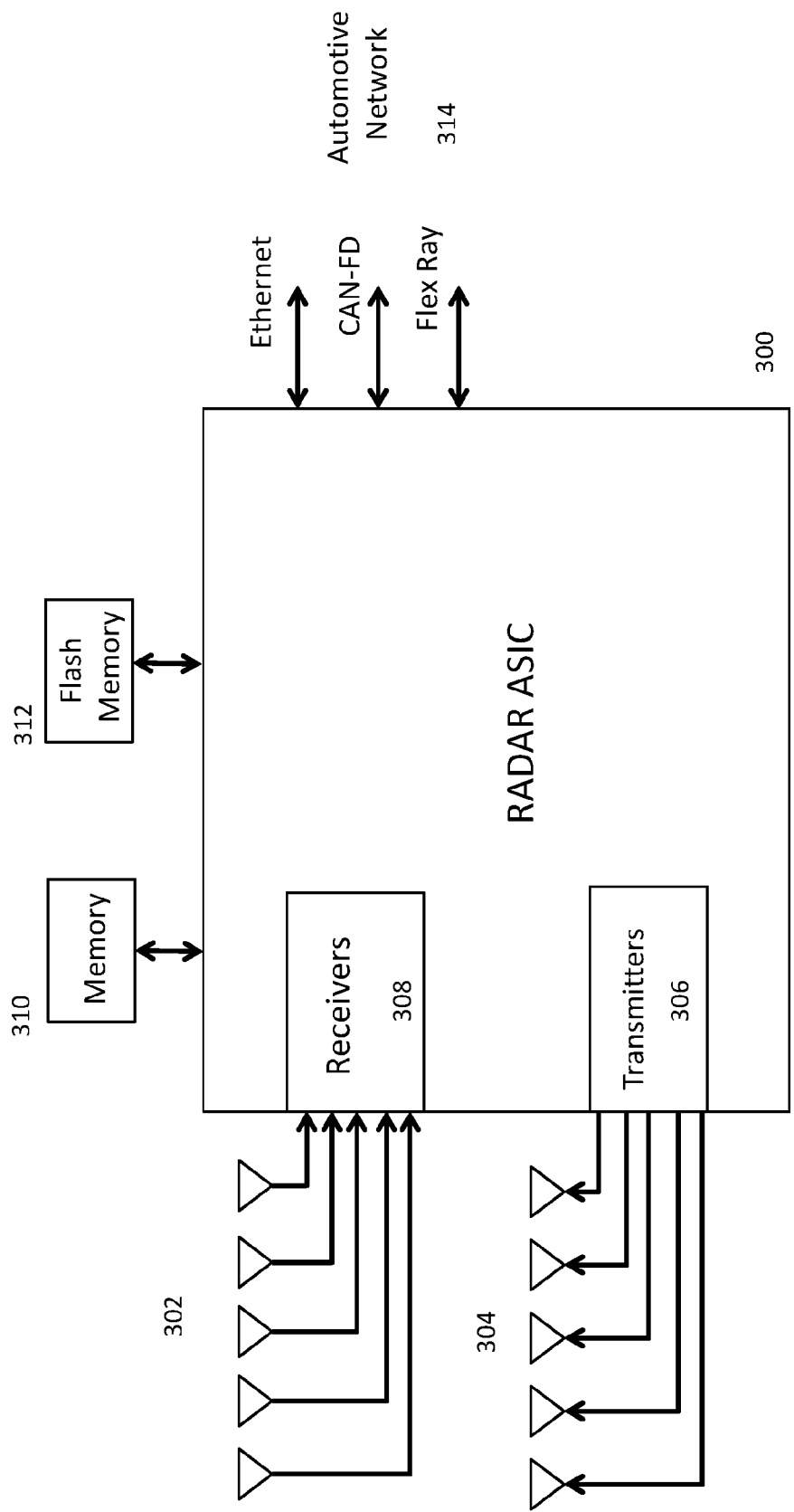
FIG. 3 is a block diagram of multiple transmitters and multiple receivers in a radar system.

A radar system with multiple antennas, transmitters and receivers is shown in FIG. 3. Using multiple antennas allows a radar system to determine the angle (azimuth or elevation or both) of targets in the environment. Depending on the geometry of the antenna system different angles (e.g., azimuth or elevation) can be determined.

The radar system may be connected to a network via an Ethernet connection or other types of network connections 314. The radar system will have memory (310, 312) to store software used for processing the signals in order to determine range, velocity and location of objects. Memory can also be used to store information about targets in the environment.

Figure 4:
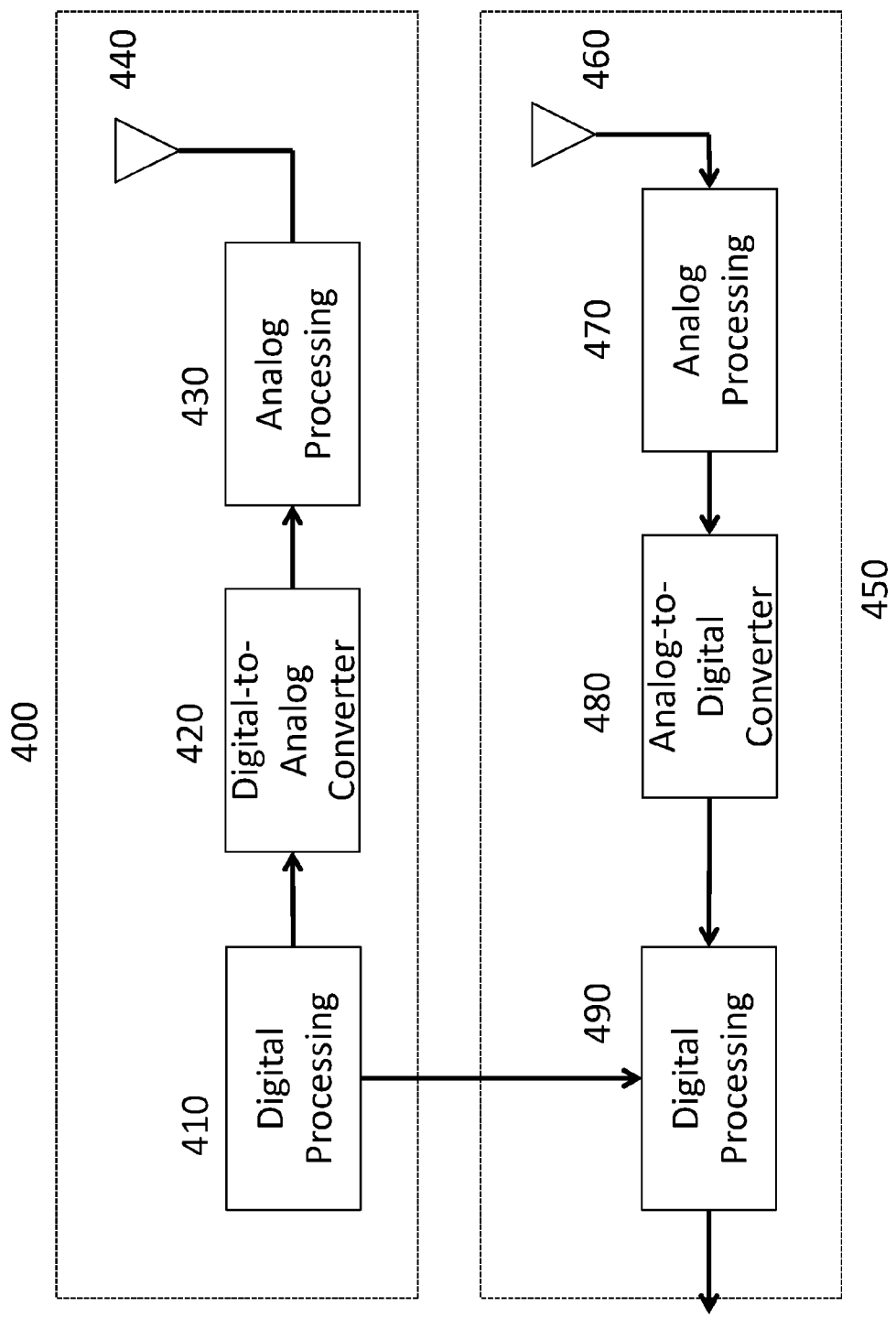
FIG. 4 is a block of a single receiver and single transmitter.

A basic block diagram of a PMCW system with a single transmitter and receiver is shown in FIG. 4. The transmitter 400, as shown in FIG. 4, consists of a digital signal generator 410, followed by a digital-to-analog converter (DAC) 420. The output of the DAC followed is up converted to a RF signal and amplified by the analog processing 430 unit. The result is then used as the antenna 440 input. The digital signal generator generates a baseband signal. The receiver, as shown in FIG. 4, consists of a receiving antenna 460, an analog processing unit that down amplifies the signal and mixes the signal to baseband 470. This is followed by an analog-to-digital converter (ADC) 480 and then digital baseband processing 490. There is also a control processor (not shown) that controls the operation of the transmitter and receiver. The baseband processing will process the received signal and may generate data that can be used to determine range, velocity and angle.

Radars must operate in various environments. For example, an automotive radar must operate in urban areas, suburban areas, rural areas, rain, snow, deserts, parking lots, garages, construction zones, to name a few. Depending on the installation location of the radar in an automobile, the transmitted signal might be reflected off of parts of the automobile. For example, reflections from a bumper in the automobile might create very strong self-interference. The set of environments an automobile is expected to operate in is extensive. Depending on the environment different types of signals might be used. A radar signal appropriate for one environment will not be the best signal to use in a different environment. The receiver processing used will also depend on the environment. The environment might be determined from the radar itself but also could be obtained by the radar from external sources (e.g., other vehicles, cellular networks, GPS).

In addition to operating in multiple environments, radar systems may have different performance objectives. Range resolution, maximum unambiguous range, Doppler resolution, angular resolution, and field of view are some of the objectives of a radar system. The smallest separation of two objects, such that they are recognized as two distinct objects by a radar, is known as the range resolution of the radar. The range resolution is inversely proportional to the bandwidth of the transmitted signal. A short-range radar (SRR) might provide a range resolution that is sub-meter (e.g., less than 5 cm) but only for distances from 0 to less than 30 meters. A long-range radar might have a much larger range resolution. Another performance measure is the maximum unambiguous range, $D_u$. This is the maximum distance of an object such that the distance can be correctly (unambiguously) determined from the received (reflected) signal. If the delay of the reflected signal can be confused with another (shorter) delay due to the period of the transmitted signal, then the distance to the object cannot be unambiguously determined. A long-range radar (LRR) might have a maximum unambiguous range out to several hundred meters whereas a SRR might have an unambiguous range out to several tens of meters.

Doppler resolution refers to the capability of a radar to discriminate the velocity of different targets. There is a maximum Doppler shift that a radar can determine without ambiguity. This is known as the maximum unambiguous velocity. A radar system using multiple antennas can determine the angle of a target relative to some reference in either the horizontal plane (azimuth) or the elevation angle (angle relative to the horizontal plane). A set of angles for which a radar can detect an object is called the field of view. Generally, with a fixed number of antennas, a large field of view would result is less angular resolution while a narrow field of view can provide better angular resolution. With certain antenna configurations, the elevation angle of an object can be determined.

The description herein includes a radar system in which there are $N_T$ transmitters and $N_R$ receivers $N_T \times N_R$ virtual radars, one for each transmitter-receiver pair. For example, a radar system with eight transmitters and eight receivers will have 64 pairs or 64 virtual radars (with 64 virtual receivers). When three transmitters (Tx1, Tx2, Tx3) generate signals that are being received by three receivers (Rx1, Rx2, Rx3), each of the receivers is receiving the transmission from each of the transmitters reflected by objects in the environment. Each of the receivers is receiving the sum of reflected signals due to all three of the transmissions at the same time. Each receiver can attempt to determine the range and Doppler of objects by correlating with delayed replicas of the signal from one of the transmitters. The physical receivers may then be "divided" into three separate virtual receivers, each virtual receiver correlating with a replica of one of the transmitted signals. In a preferred radar system of the present invention, there are 1-4 transmitters and 4-8 receivers, or more preferably 4-8 transmitters and 8-16 receivers, and most preferably 16 or more transmitters and 16-64 or more receivers.

As mentioned earlier, there are various types of signals used in radar systems. A pulsed radar transmits a signal for a short duration of time then turns off the transmitter and listens for reflections. A continuous wave radar transmits a continuous signal. One type of continuous wave radar signal is known as frequency modulated continuous wave (FMCW) signal. The frequency of this signal is varied from some low frequency value to a high frequency value over some time interval and then repeats. Another type of continuous wave radar signal is known as phase modulated continuous wave (PMCW). The phase of the transmitted signal is varied in PMCW. Often the variation of the phase is according to a spreading code. The spreading code may be binary (e.g., +1 and −1) in which case the phase of the transmitted signal at any time takes on one of two possible values (e.g., 0 and π radians). Spreading codes with more than two levels can also be used. Often the code repeats after a certain duration in time duration, sometimes called the pulse repetition interval (PRI). Various types of spreading codes can be used. These include pseudorandom binary sequence (PRBS) codes also called m-sequences, almost perfect autocorrelation sequences (APAS), Golay codes, constant amplitude zero autocorrelation codes (CAZAC) also known as Frank-Zadoff-Chu (FZC) sequences, as well as many other codes that can be used. In a radar system with a single antenna, a single spreading code is used. The autocorrelation of this single code determines the capability of the radar to estimate the range (range resolution and maximum unambiguous range). Codes with good autocorrelation properties include Barker sequences, m-sequences, FZC sequences, and Golay codes. These codes have small sidelobes (the off-center autocorrelation). Codes that have ideal autocorrelation (e.g., Golay codes, CAZAC) can have range sidelobes in the presence of non-zero Doppler shift that will limit the detectability of far targets in the presence of near targets.

In a multiple-input, multiple-output (MIMO) system, there are multiple transmitters that operate simultaneously. Each transmitter uses a spreading code and thus multiple codes are needed, one for each transmitter. In this case (multiple transmitters), codes that have good autocorrelation, as well as good cross correlation properties are desirable. Generally, the better the autocorrelation of codes, the worse the cross correlation properties.

Figure 5:
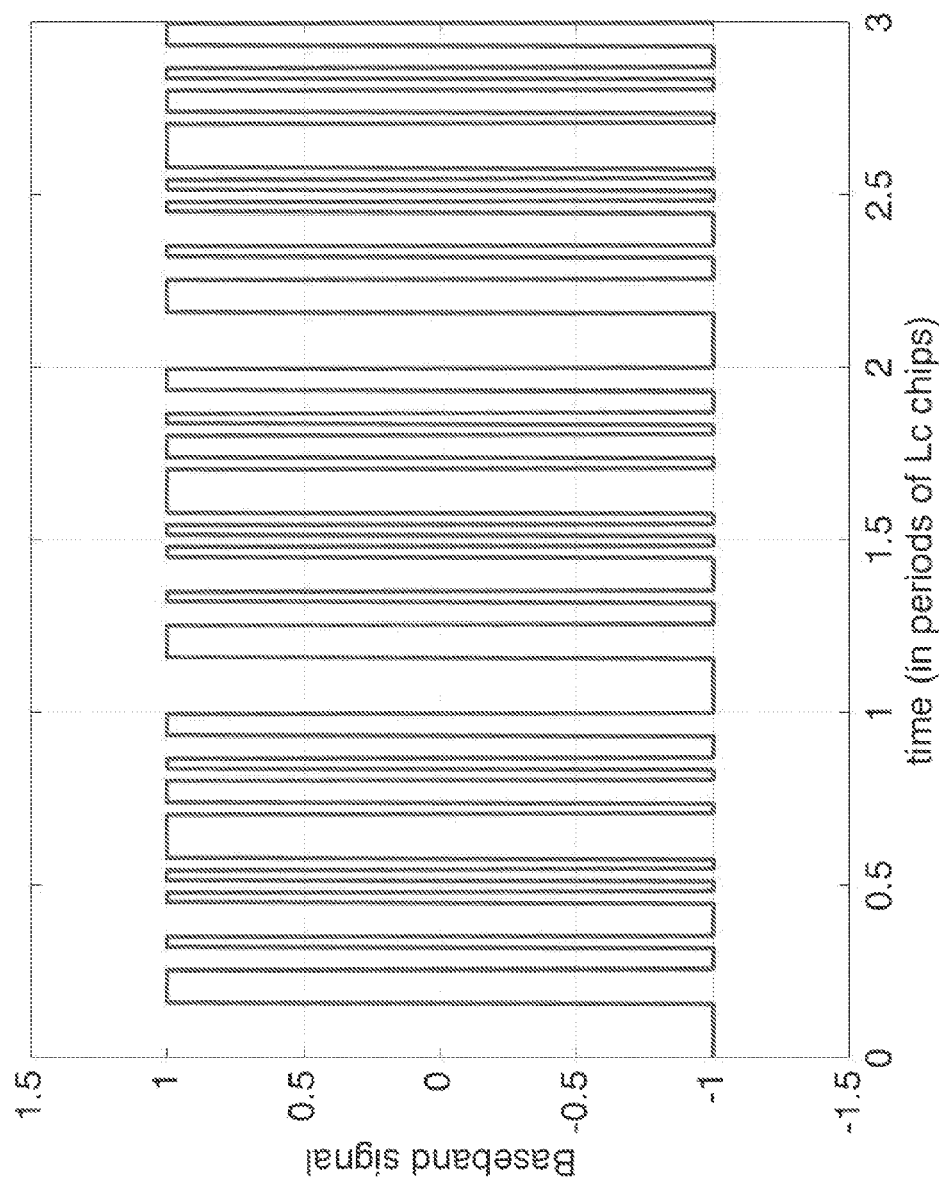
FIG. 5 is a graph illustrating an exemplary transmitted signal using an m-sequence of length 31 in accordance with the present invention.

FIG. 5 shows a baseband signal which has a period of $L_c=31$. The chips in this example are from a maximal length sequence (m-sequence) of length $L_c=31$ generated by an exemplary shift register of length 5. Note that the signal repeats every $L_c$ chips or $L_c T_c$ seconds. The pulse repetition rate is $R_{pr}=1/(L_c T_c)$. The transmitted signal is generated from the baseband signal by modulating the baseband signal onto a carrier frequency to generate a radio frequency signal.

As illustrated in FIG. 4, the received signal is down-converted to a complex baseband signal via an RF front end analog signal processing 470. The analog signal processing involves amplification, mixing with a local oscillator signal, and filtering. The mixing is with two sinusoidal signals that are 90 degrees out of phase (e.g., cosine and sine). After down conversion, the complex analog baseband signal is converted to a complex baseband digital signal by an analog-to-digital converter (ADC) 480. The complex baseband digital signal (output by the ADC 480) is then the input to a digital processing unit 490. The digital processing unit 490 performs correlations or matched filtering. The correlators multiply the received complex baseband signal by a delayed replica of the baseband transmitted signal and then the result is accumulated over a certain time interval. A bank of correlators where each correlator has a different delay used for the replica of the baseband transmitted signal will produce a set of correlations that correspond to different ranges of objects. In essence, a correlator that has a particular delay of the baseband transmitted signal is looking for the presence of a reflection from an object at a distance corresponding to the particular delay for the particular correlator, and for which the round-trip delay is the delay used for the baseband transmitted signal.

A matched filter is a device that produces all correlations for all possible delays. That is, the output of the matched filter at a given time corresponds to a correlation with a given delay applied to the transmitted signal when doing the correlation. The matched filter provides all possible correlations. Note that the matched filter should produce a complex output because the input is complex. Alternatively, there could be a filter for the real part of the input and a filter for the imaginary part of the input.

Figure 6:
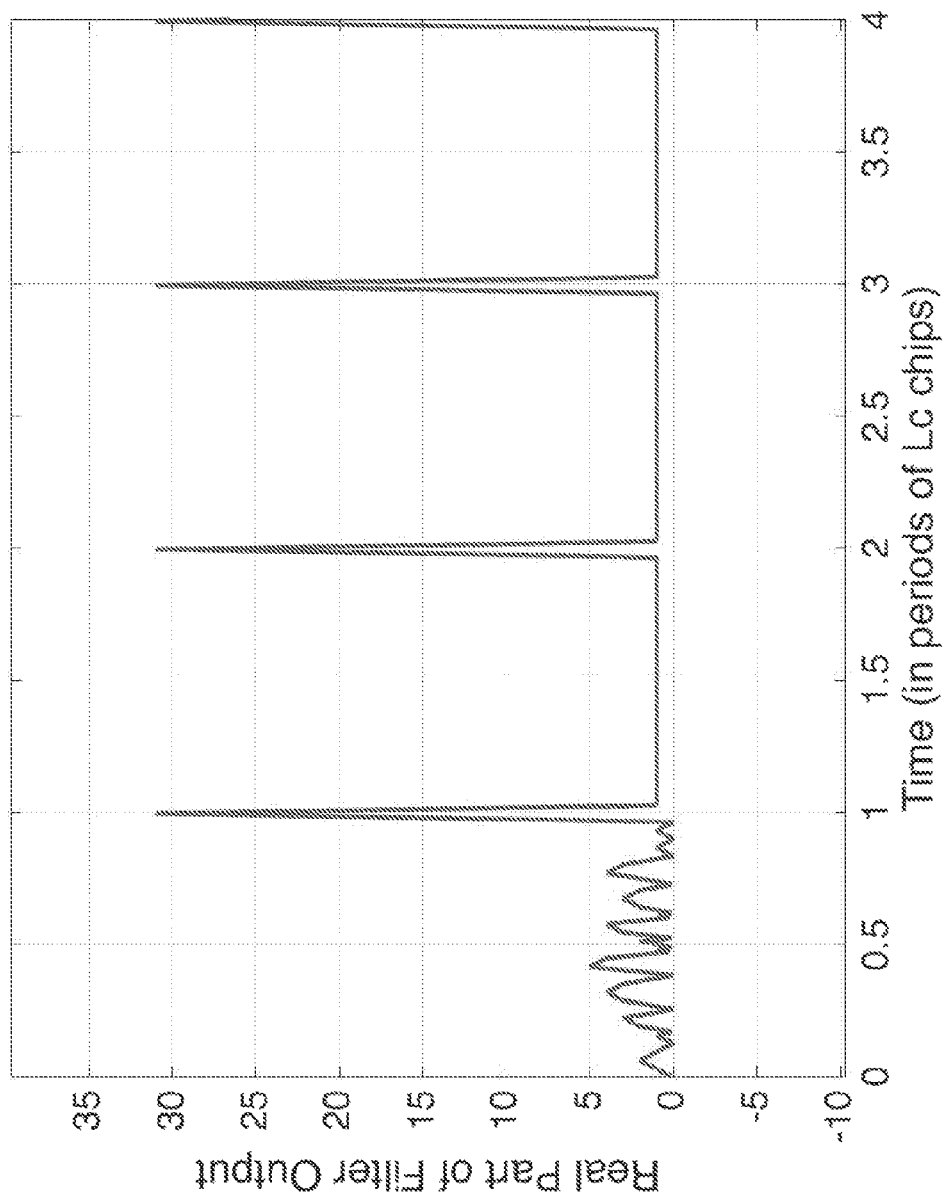
FIGS. 6-9 are graphs illustrating exemplary matched filter outputs over time in accordance with the present invention.

FIG. 6 shows the real part of the output of a matched filter due to the transmitted baseband signal shown in FIG. 5. Here we assume the radar started to transmit at time 0 and there is no delay between the transmitter and receiver. That is, there is an object at distance 0. The matched filter output before a full period of the signal is transmitted generates partial correlations. That is, it correlates with only a portion of the code because only a portion of the code has been transmitted. Only after the entire period of the code has been transmitted does the correlation reach a peak. In continuous operation, an object that has a delay of one period of the spreading code will appear to have the same delay as an object at distance 0. Thus, a radar using this system cannot determine whether the delay is 0, one period of the spreading code, two periods of the spreading code, and so on. We say the maximum unambiguous range in this case corresponds to at most one period of the spreading code. A longer spreading code will yield a larger maximum unambiguous range. A delay of τ corresponds to a range of τc/2 where c is the speed of light. The factor of two is because the delay corresponds to the round-trip time from the radar to the target and back to the radar. Here the assumption is that the transmitter and receiver are approximately co-located.

Figure 7:
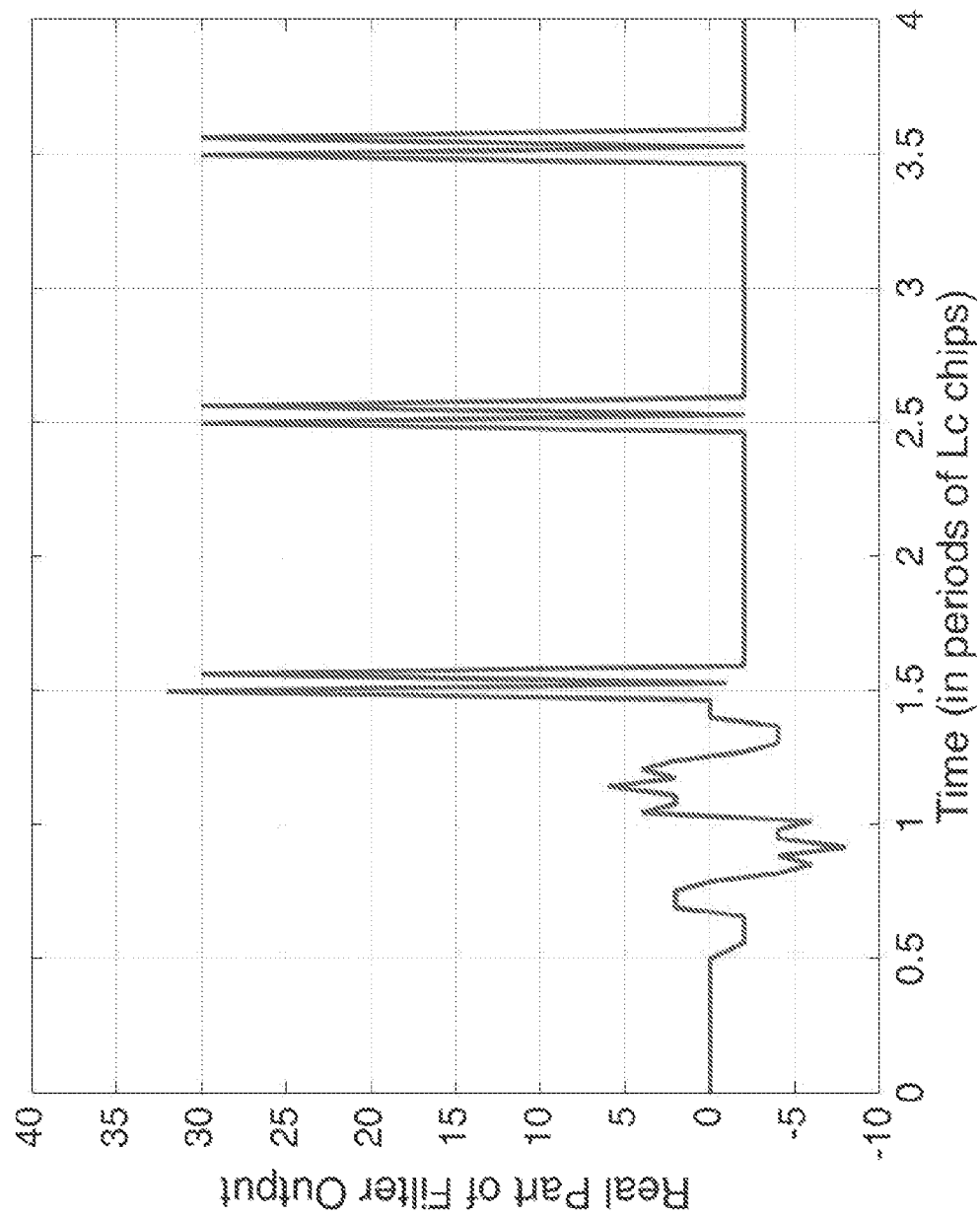

FIG. 7 shows the real part of the output of the matched filter when there are two objects that have differential range delay of 2 chip durations. The filter output shows two distinct peaks in the output of the matched filter.

For such PMCW radar systems that utilize nonideal spreading codes and correlate over a certain time interval, the autocorrelation is not ideal. That is, the sidelobes are not zero. The sidelobes of a near target can mask the peak of the correlation for a far object or target because the signal from the near object or target is far stronger than the signal from the far object or target.

Range Estimation

Figure 8:
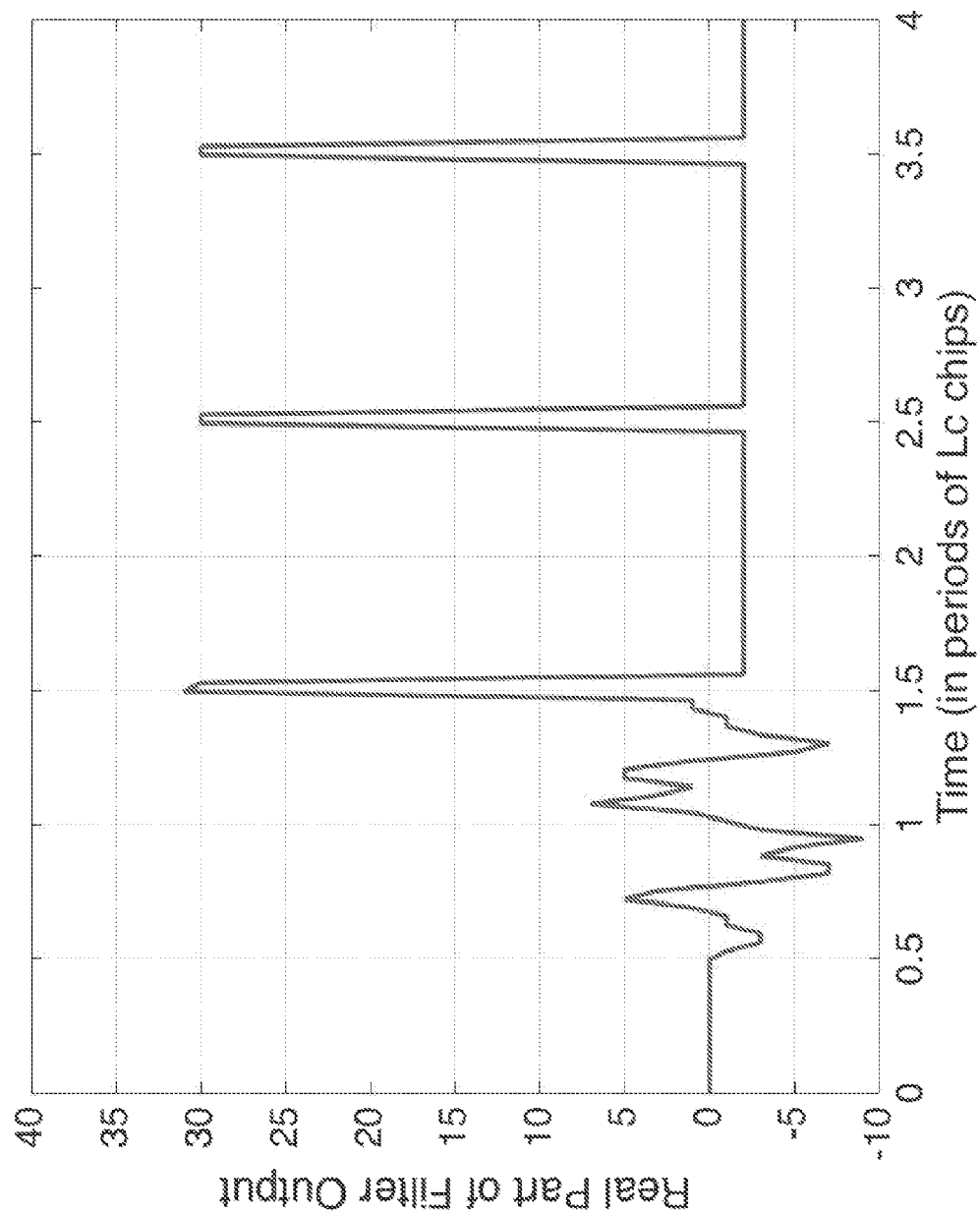

FIG. 8 shows the case where the differential round trip delay between two targets is one chip duration. In this case two objects cannot be distinguished and thus the range resolution of this would correspond to the differential distance corresponding to a duration of ½ a chip. This is a range resolution of $$D_r=(T_c/2)c=c/(2R_{pr}L_c).$$

If the chip duration, $T_c$, is decreased, then the range resolutions would improve proportionally. However, changing the chip duration changes the bandwidth, which might be limited by regulations. If there are 31 chips per period of the spreading code there are at most 31 different ranges that can be distinguished. As an example, if $T_c=1$ nanosecond (1G chips/second) then the range resolution would be limited to 0.15 meters. That is, two objects separated by less than 0.15 m would cause reflected signals to be less than a chip duration apart in delay. For this example, the maximum unambiguous range would be 4.65 m. That is, an object at a distance of 4.65 m would cause a reflected signal to have delay exactly equal to the period of the signal and thus would appear as an object at distance 0 m. This is a very small maximum unambiguous range for automotive applications and a much longer spreading code would provide for more realistic unambiguous range. For example, a spreading code of length 1023 would provide a maximum unambiguous range of about 153 m. In general, if a signal repeats every $T_{pr}$ or at rate $R_{pr}$, then the maximum unambiguous range $D_u$ is $$D_u = cT_{pr}/2 = (cT_cL_c)/2 = c/(2R_{pr})$$

where c is the speed of light.

Velocity Estimation

One goal of an exemplary radar system is to estimate the differential velocity between the radar system and a target. Because targets in the environment, or the radar itself, are moving, the signal reflected from an object will not have the same frequency as the transmitted signal. This effect is known as the Doppler Effect and can be used to determine the relative velocity of targets in the environment. Suppose the differential (radial) velocity of the target relative to the radar system is $\Delta v$ and the carrier frequency is $f_c$. Then, the Doppler frequency shift is $f_D = 2\Delta V\, f_c/C$. This is because there is a Doppler shift of $\Delta V f_c/c$ between the radar transmitter and the target and then an additional $\Delta V f_c/c$ Doppler shift of the reflected signal from the target to the radar receiver. For example, a carrier frequency of 79 GHz with a differential velocity of 300 km/hour=83.3 m/s would result in a frequency shift of about 44 kHz. A frequency shift of $f_D$ corresponds to a differential velocity of $\Delta V = (f_D) c/(2\, f_c)$.

Figure 9:
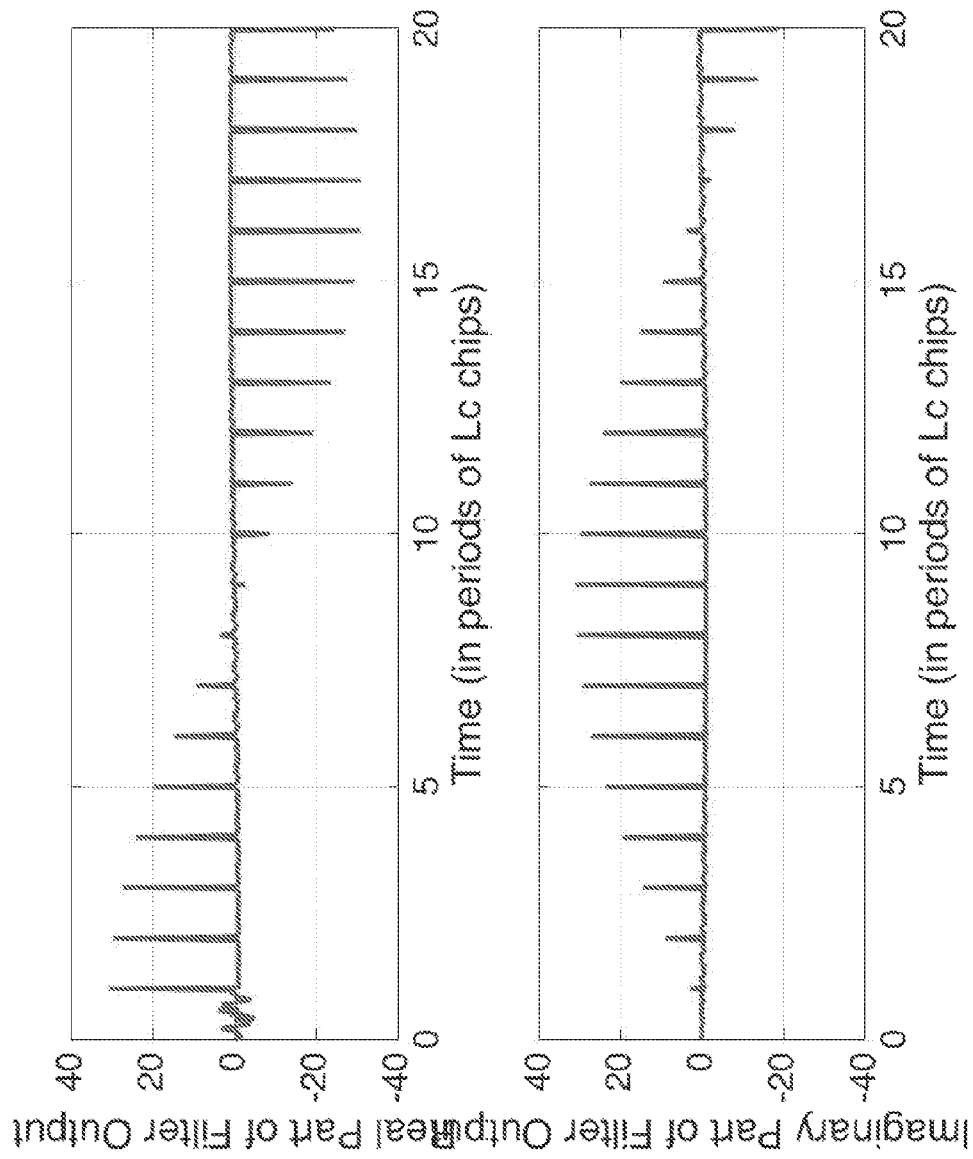
Figure 10:
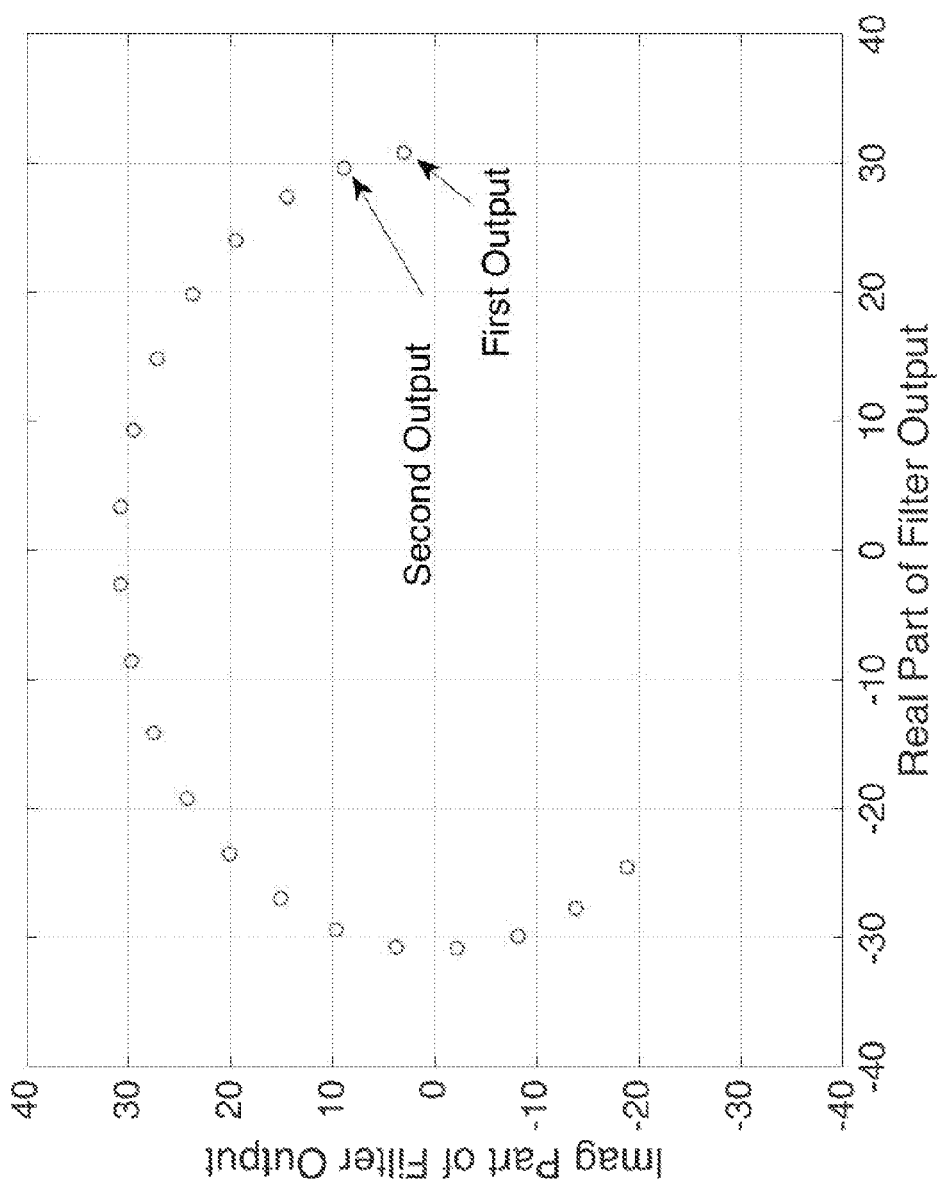
FIG. 10 is a graph illustrating an exemplary imagery part of filter output vs a real part of filter output in accordance with the present invention.

Suppose that a signal, for example an m-sequence, is repeated N times. This is called a scan. The period of the signal is $L_c T_c$. The time duration of the scan is $N\, L_c T_c$. During each repetition a correlation with a spreading code with a given delay (e.g., corresponding to the delay with a given target) is calculated. This correlation calculation generates a complex number for a given delay and this repeats N times during a scan. The N complex numbers can be used to determine the Doppler frequency shift at the given delay. In the absence of Doppler frequency shift the complex correlation values will be constant. In the presence of a Doppler shift the complex correlation values will rotate. The rate of rotation will be related to the Doppler frequency. FIG. 9 illustrates the real and imaginary parts of the matched filter output when there is a Doppler shift. FIG. 10 shows the complex values at the peak correlation outputs. As can be seen, the matched filter output is rotating around a circle. The rate of rotation is a measure of the Doppler frequency. Knowing the Doppler frequency allows a calculation of the relative velocity of a target.

One way to estimate the Doppler frequency is to use a fast Fourier transform (FFT) on the complex samples. With this approach to estimating the frequency shift due to Doppler, with N points as the input to the FFT, there will also be N frequency points generated. The frequency resolution possible is over the range of frequencies from a negative frequency of $-R_{pr}/2$ to a positive frequency $+R_{pr}/2$ or a range of $R_{pr}$. Thus the spacing between frequency points will be $f_r = R_{pr}/N$. This is the frequency resolution. This corresponds to a velocity resolution of $$V_r = c R_{pr}/(2 f_c N).$$

If the samples are produced at a rate of $R_{pr} = 1/T_{pr}\, i = 1/L_c T_c$, then the frequency range that those points represent is limited to $-R_{pr}/2$ to $+R_{pr}/2$. Thus, the maximum unambiguous differential frequencies $f_u$ that can be represented is given by $-R_{pr}/2 < f_u < +R_{pr}/2$. When this is converted to velocity the result is that the maximum unambiguous velocity is $$cR_{pr}/(4f_c) < V_u < +cR_{pr}/(4f_c).$$

Increasing the repetition rate increases the maximum unambiguous velocities that can be determined. However, increasing the repetition rate decreases the maximum unambiguous range that can be determined. The product of the maximum unambiguous velocity and maximum unambiguous range is limited as $$-c^2/(8f_c) < D_u V_u < c^2/(8f_c)$$

which is independent of the various parameters of the transmitted signal, except the carrier frequency.

The product of the velocity resolution and the range resolution is given as $$D_r V_r = c^2/(4 f_c L_c N)$$

where $L_c$ is the number of chips in a single period of the spreading code and N is the number of points in the FFT used to determine the velocity. For a fixed scan time ($L_c N T_c$) and fixed chip duration $T_c$, there is a tradeoff between the resolution possible for the range and the resolution possible for the velocity. By increasing N and decreasing $L_c$, the velocity resolution improves at the expense of range resolution. Similarly, decreasing N and increasing $L_c$ will improve the range resolution at the expense of velocity resolution.

The above illustrates a tradeoff between the maximum unambiguous range and the maximum unambiguous velocity that only depends on the carrier frequency. We can only obtain an increased product of unambiguous velocity and range if we decrease the carrier frequency. In some circumstances we might be interested in obtaining a larger unambiguous range at the expense of a smaller unambiguous velocity (or vice versa). Thus, a system that can adjust the repetition frequency of the signal would be able to adjust to different objectives. In addition, there is tradeoff between range resolution and velocity resolution for a given bandwidth and scan duration. In some situations it would be advantageous to have better range resolution while in other cases it would be beneficial to have better velocity resolutions. Thus, it would be of benefit to be able to adjust the system parameters depending on the objective function of interest to obtain either the best range resolution or the best velocity resolution (with a given fixed time interval for the scan).

As an example, consider a radar system with a desired scan duration (time to produce a velocity estimate) of 0.1 ms. Suppose the chip rate is fixed at $10^{-9}$ seconds and the carrier frequency is 79 GHz. A spreading code period of 1,000 chips would allow 100 repetitions. This yield an unambiguous range of 150 m and an unambiguous velocity estimate range of (−950 m/s, +950 m/s). On the other hand, a spreading code period of 10,000 would allow only 10 repetitions of the code. The unambiguous range would increase to 1500 m, while the unambiguous velocity would decrease to (−95 m/s, +95 m/s).

At the receiver it is necessary to store the complex outputs of the correlators for different possible ranges and for different receivers. A sequence of N complex samples needs to be stored for a particular range and a particular virtual receiver (a receiver matched to a particular spreading code of a transmitter) in order to determine an estimate of the velocity for an object at a particular range. For example suppose that there are 512 range bins and the number of repetitions of the code is 1024. This would require storing 512×1024 complex numbers with each complex number requiring 4 bytes of storage. This would require more than 2 million bytes of storage per virtual receiver. If there are 4 transmitting antennas and 16 receiving antennas then this would require about 134 Mbytes of storage, much more than is practical with current storage limits integrated onto a chip.

On the other hand storing this off chip would require a significant amount of time to transfer data. At a rate of 1600 Mbytes/second only about 12 transfers could happen per second. The number of virtual receivers determines the possible angle resolution. More receivers can provide more angular resolution at the expense of additional storage or at the expense of worse range or velocity resolution. Thus, the storage restrictions limit either the angular resolution, the range resolution, or the velocity resolution.

In addition to the above, interference from other radar systems needs to be accounted for. Interfering radars could be using the same type of signals as the vehicle in which the invention of this patent is installed. It is also possible that the interfering radar system is using a different type of signal (e.g., FMCW vs. PMCW). It would be useful to be able to mitigate in some way the effect of interfering radar systems. Different types of interference will require different mitigation techniques. Mitigation of the effects of interfering systems generally will not be ideal and it is often the case that the mitigation, while reducing the effect of the interference, will also degrade the desired signal in some manner. If no interfering radar system is present, then it would be desirable to not employ the mitigation technique. As such, it would be desirable to have a radar system that can adapt to the environment present.

Figure 11A:
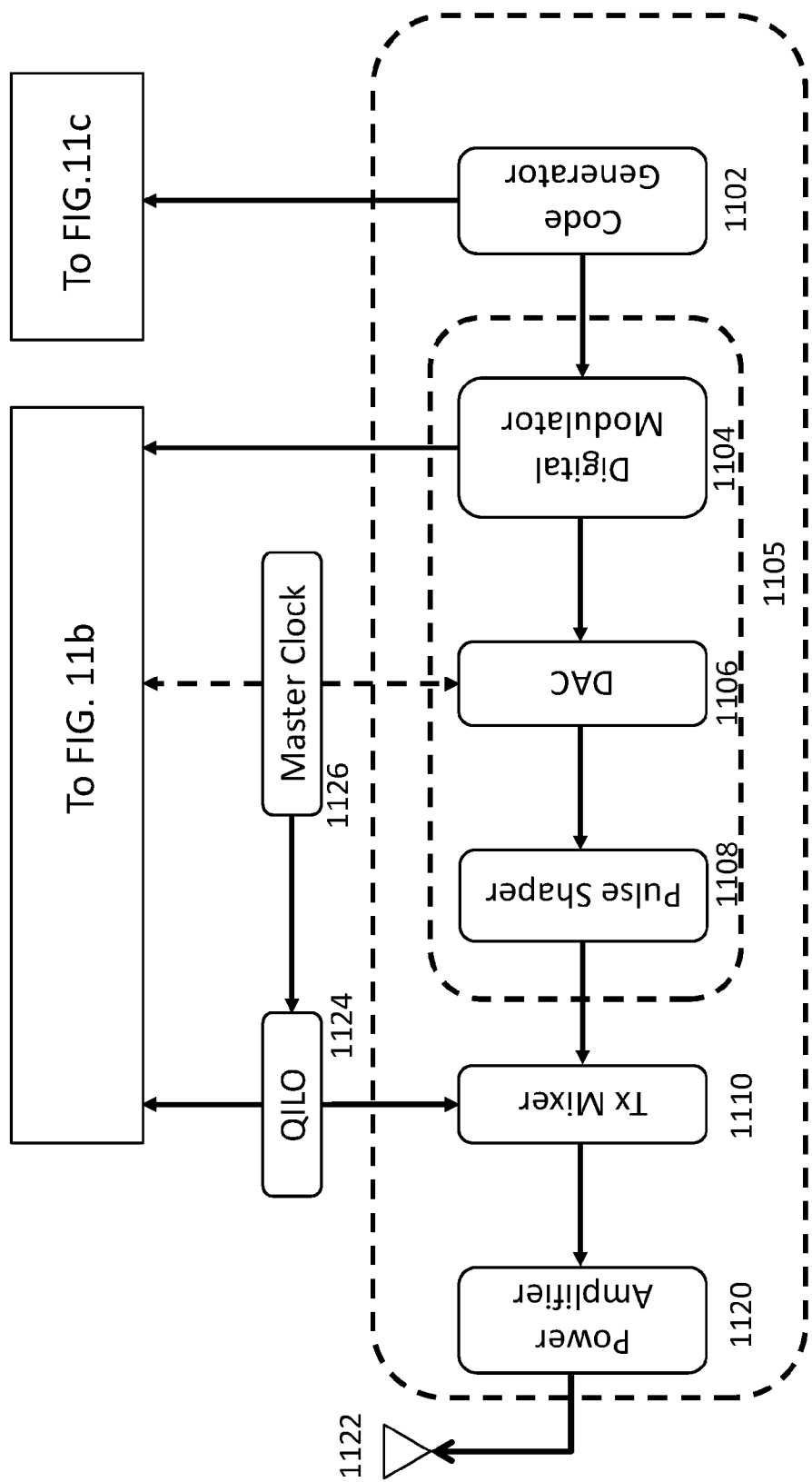
FIGS. 11a, 11b, and 11c are block diagrams illustrating exemplary steps to signal processing in accordance with the present invention.
Figure 11B:
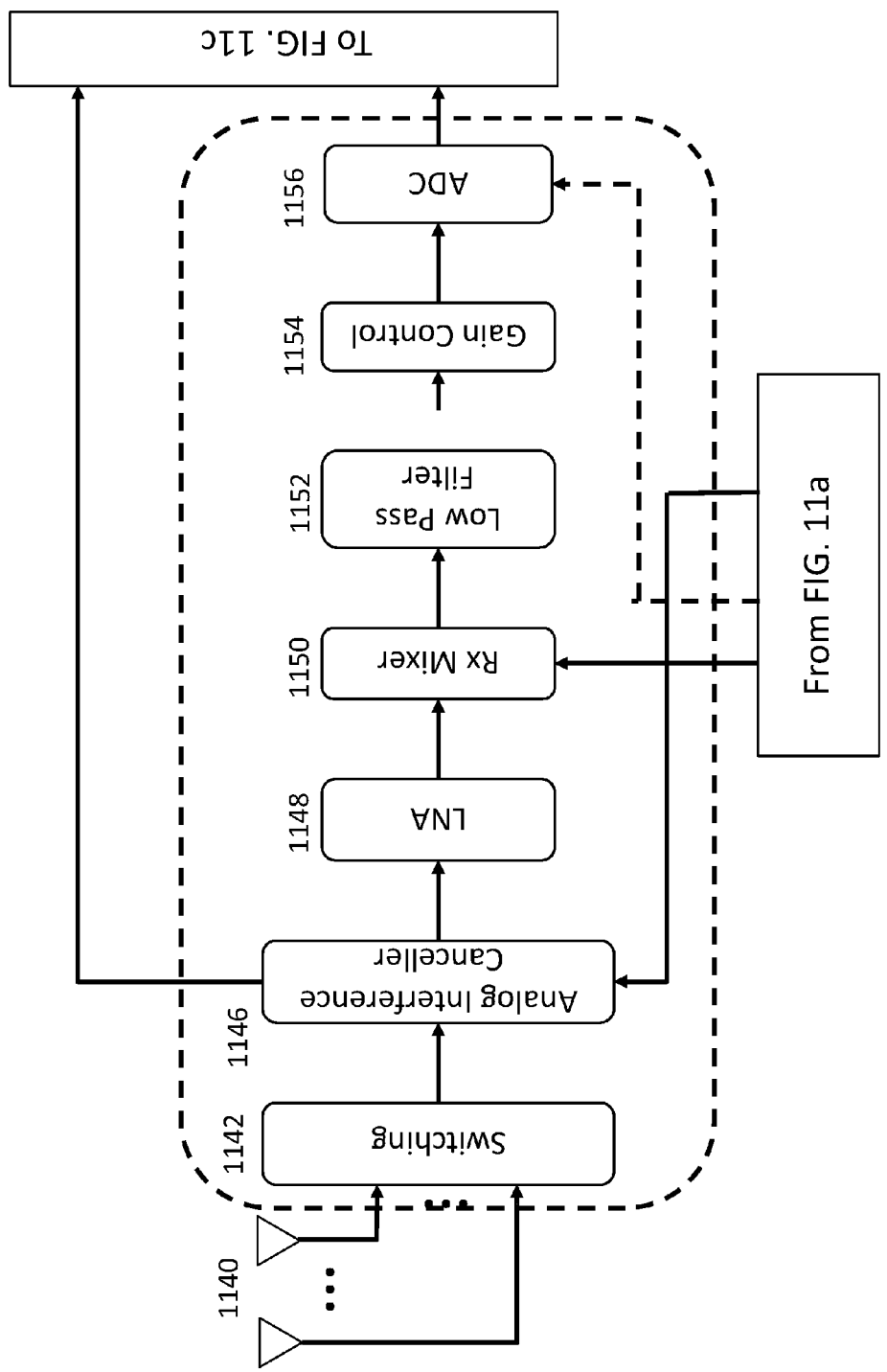
Figure 11C:
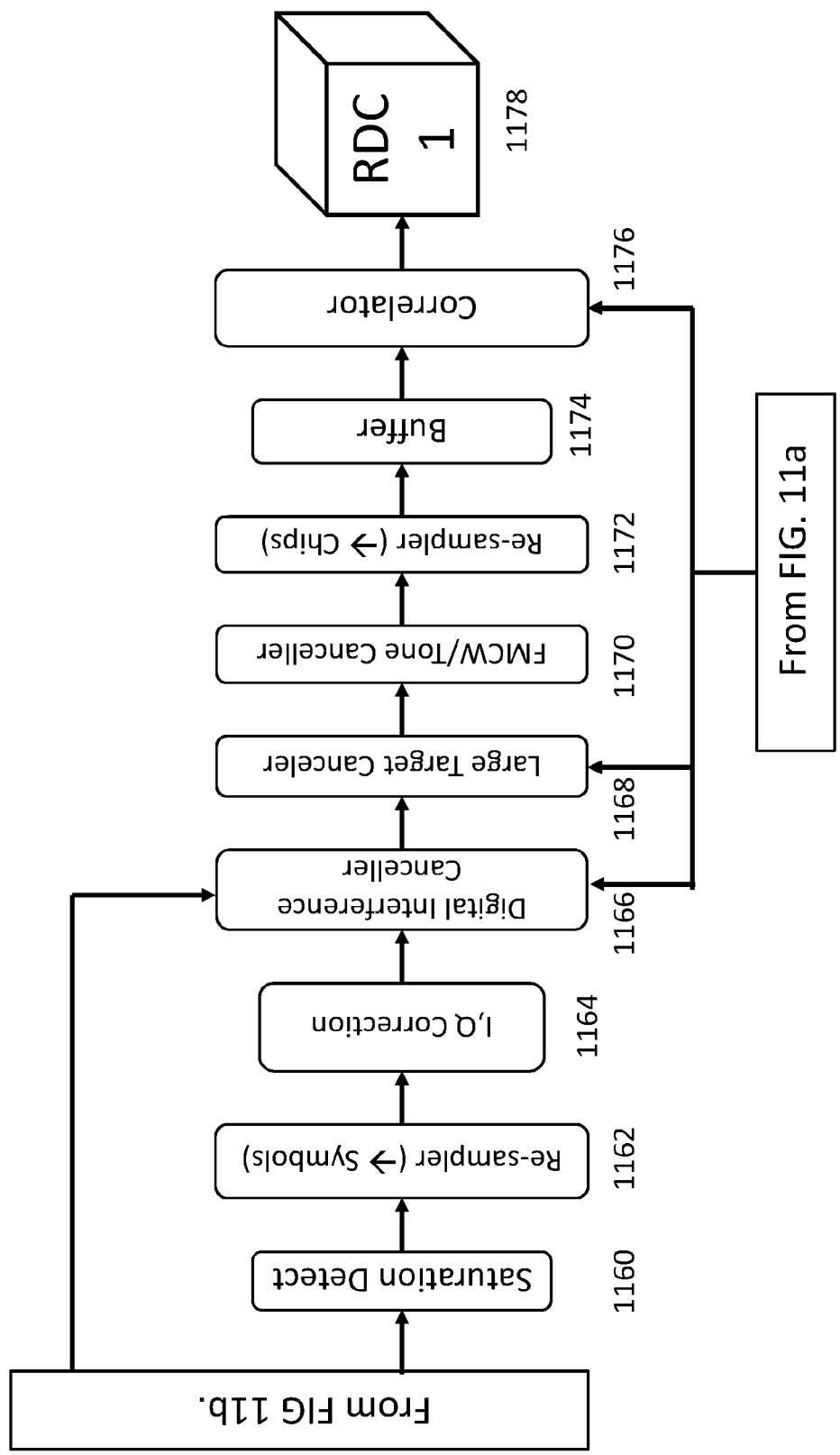

In a preferred embodiment, the processing of the signals is shown in FIGS. 11a, 11b, 11c. In FIG. 11a, the processing for the transmitter is shown. A code generator 1102, generates a spreading code. The output of the code generator is modulated with a digital modulator 1104 to generate a complex baseband signal. The modulation is accomplished in two parts. In the first part the code is mapped to a complex sequence of in-phase and quadrature phase components at the digital modulator 1104. The result is converted to an analog signal by the DAC 1106. The output is further shaped with a pulse shaper 1108 to generate a complex baseband analog signal. This signal is up converted with a TX Mixer 1110. An oscillator 1124 is the other input to the mixer to produce a radio frequency (RF) signal. The oscillator signal is also used at the receiver. This is indicated by the connection of the oscillator to components in FIG. 11b. The result of up-conversion is then amplified by a power amplifier 1120 before transmission by an antenna 1122. A master clock 1126 is used to control the timing of the oscillator and to control the timing of the digital circuitry. The master clock 1126 and the oscillator are also shared with the transmitter circuitry shown in FIGS. 11b and 11c. The output of the digital modulator 1104 is shared with the receiver so that the receiver can apply interference cancellation. The output of the code generator 1102 is shared from the transmitter to receiver so appropriate correlation or matched filtering can be applied at the receiver.

FIG. 11b illustrates the analog processing part of the receiver processing. One or more receiving antennas are connected to a switch 1142 that connects one of the antennas 1140 to a receiver. There can be more than one receiver so that different antennas can be connected to different receivers. Not all the antennas need to be connected to a receiver. Because there can be very strong self-interference from the transmitted signal reflecting off of nearby objects (e.g., a bumper), the analog interference cancellation unit 1146 is employed. A signal from the cancellation unit 1146 can be provided to the digital processing where additional interference cancellation can be done. The output of the analog interference cancellation 1146 is provided to a low noise amplifier 1148. The low noise amplifier output is mixed down to baseband by an RF mixer that also uses the oscillator signal (from FIG. 11a). The resulting low pass complex baseband analog signal is filtered (with low pass filter 1152), and further amplified (with gain control 1154) before being converted to a digital signal by an ADC 1156. The result of the ADC 1156 is fed to digital processing circuitry shown in FIG. 11c.

FIG. 11c illustrates the digital processing of the circuitry of the receiver. Various signal processing blocks are shown. First, a saturation detection block 1160 detects whether the ADC input has caused the ADC to saturate. This detection can be used to adjust the gain in the analog processing part of the receiver 1154. Next, a change in the sample rate can be done (1162) to reduce the amount of processing necessary. After resampling, correction for any mismatch in I, Q gain or non-orthogonality can be employed (via I/Q Correction module 1164). Additional interference can be cancelled then in a digital interference canceller 1166. Information from the processing done by the analog cancellation unit 1146 can be used (as shown by the connection from FIG. 11b) by the digital interference cancellation unit 1166. This can more accurately (as compared to the analog interference canceller 1146) remove interference from near targets, including the bumper. Further interference cancellation (with large target canceller 1168) can be done to minimize the effect of sidelobes of a near target on the detectability of a further target. Interference from other radar systems, such as an FMCW system, can also be incorporated (such as FMCW/Tone Canceller 1170) into the digital processing. The resulting information is stored in a buffer 1174. This allows all digital processing to be suspended temporarily in order to not create unwanted radio frequency interference from the digital processing. Finally, the signal is processed by correlating, with a correlator 1176, with delayed versions of the code from the code generator (1102). The correlator(s) 1176 could be implemented in a number of ways including a matched filter and an FFT-based approach. The samples of the output of the correlator or matched filter (1176) are stored in memory as radar data cubes (RDC), such as RDC1 (1178). The correlation values for different delays, different receivers and different times are stored in the radar data cube. The information from RDC1 is processed further to determine object velocity and angle (e.g., azimuth or elevation or both). Further software control of the processing of information stored in RDC1 may be performed to determine the velocity of targets.

The analog processing of the received signal from the antenna to the ADC is called the analog front end. The processing of digital signals from the ADC to RDC1 is called the digital front end. The processing of digital signals from the RDC1 to generate Doppler information and angle information is called the digital back end.

Figure 12:
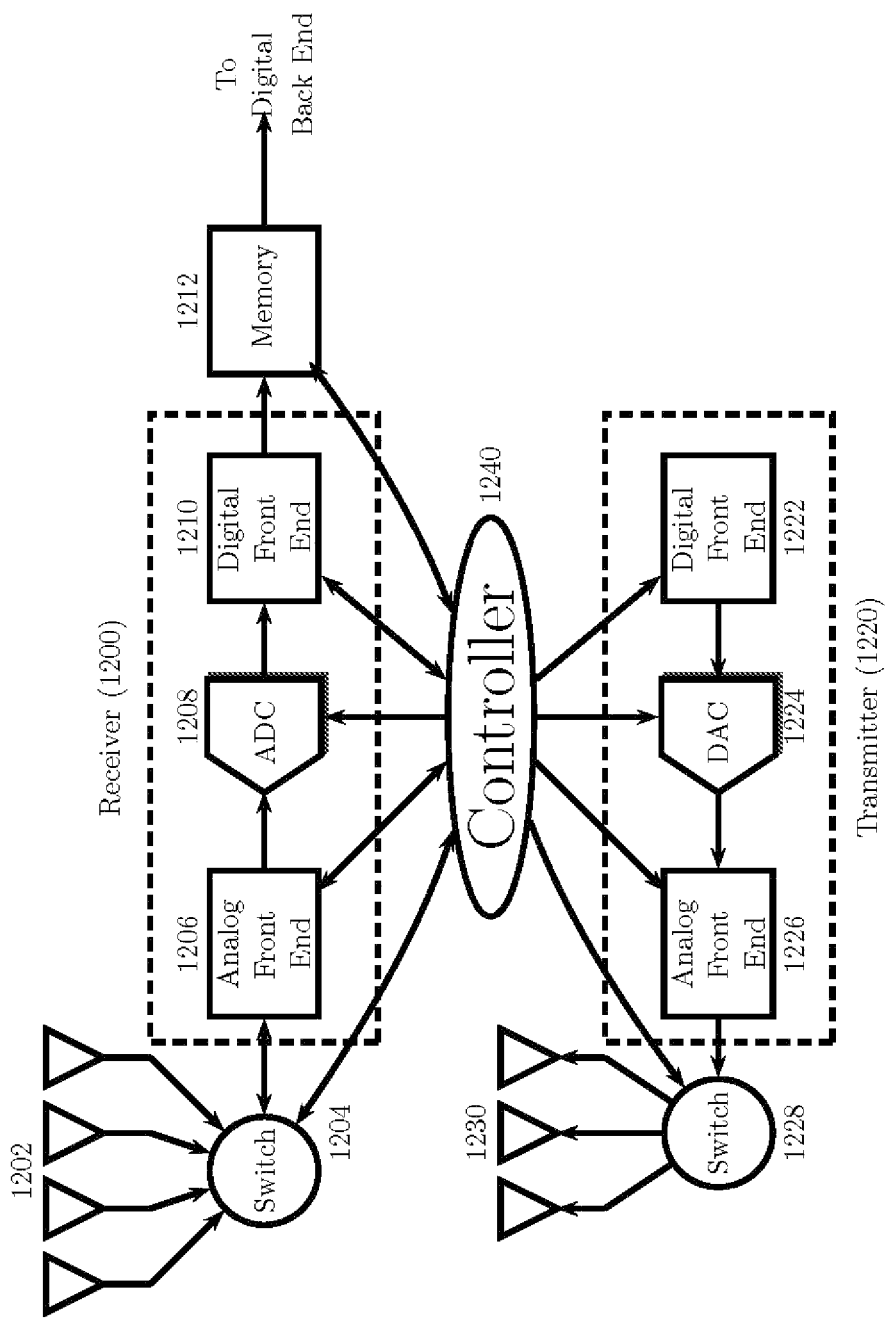
FIG. 12 is a block diagram of an exemplary controller interacting with a receiver and transmitter of a radar system in accordance with the present invention.

As mentioned above, the signals to be used for transmitting, and the receiver processing to be employed, depend on a number of different factors including the environment (e.g., an urban area, suburban area, parking lot, garage, construction zone etc.). Different objectives of the radar system might be desired (e.g., small range resolution, small velocity resolution, small angular resolution, etc.). Different interference might be present in the radar system (e.g., FMCW radars, PMCW radars, etc.). It is desirable to be able to adapt the radar to different environments, different performance objectives, and different types of interference. Embodiments of the present invention provide for a software controllable adaptable radar system. The structure of the radar system is shown in FIG. 12. The radar system will have a number of antennas 1202, 1230, transmitters 1220, and receivers 1200. In FIG. 12, a number of antennas 1202 are connected to a switch 1204. The switch 1204 allows the antennas 1202 to be connected to a number of receivers 1200. In FIG. 12, only one receiver 1200 is shown but there could be multiple receivers 1200. A receiver 1200 will have an analog front end 1206, an analog-to-digital converter 1208, a digital front end 1210, and memory 1212 for storing the results of processing the signal that will be processed by a digital back end. There could be a single analog front end 1206 and a single ADC 1208 with multiple digital front end processing units 1210 and associated memories 1212. In addition, a controller 1240 will be present for controlling the operation of the system. The controller 1240 will also control the digital backend of the system. The controller will comprise a control processor running software and memory storing the control program. The memory used for the control processor could be part of a larger memory that also stores the information generated by the digital front end 1210. The controller 1240 will control the digital front end 1210 and the analog front end 1226 of the transmitter 1220 and aspects of the analog-to-digital converter 1208.

The radar system will also include a number of transmitters 1220. One such transmitter 1220 is shown in FIG. 12. The transmitter 1220 will consist of a digital front end 1222, a digital-to-analog converter 1224 and an analog front end 1226. It is also possible that antennas (1202, 1230) can be used for either transmission or reception (depending on the configuration of the switch(es) (1204, 1228)).

Figure 13A:
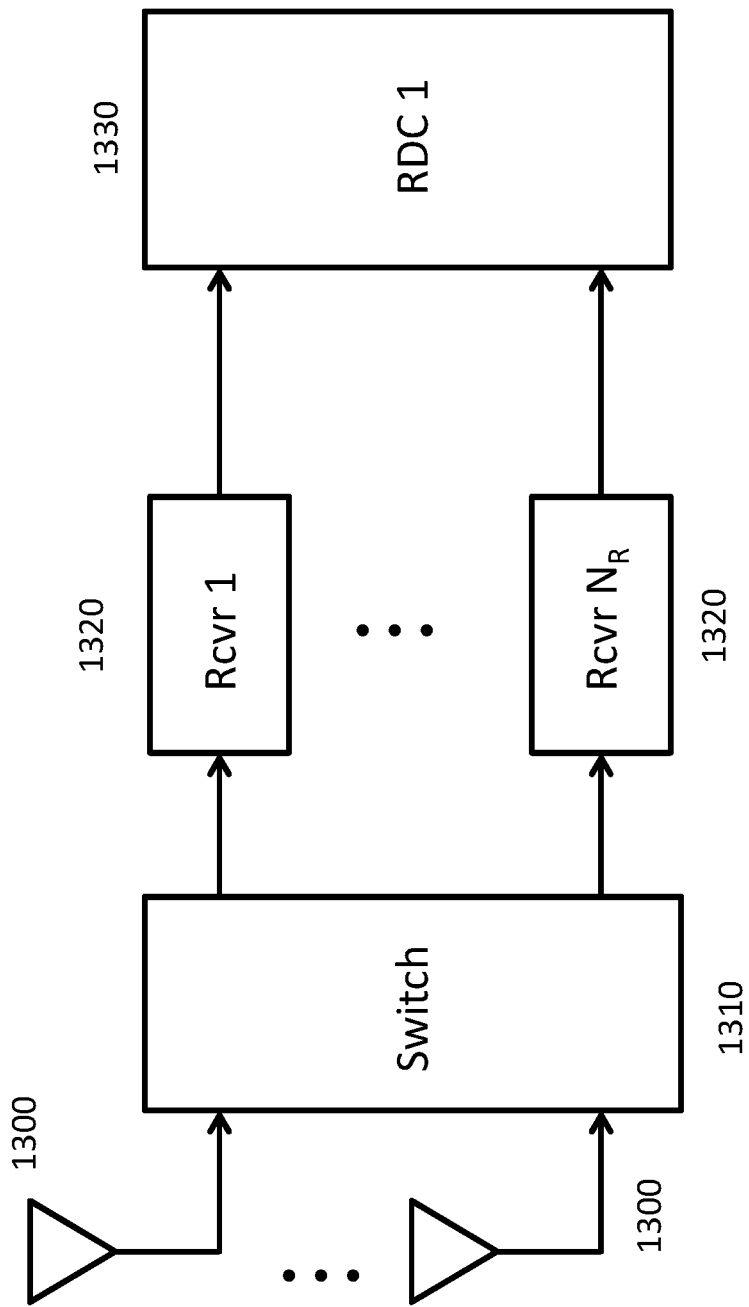
FIGS. 13A and 13B are block diagrams of an exemplary radar system architecture with multiple receivers in accordance with the present invention.
Figure 13B:
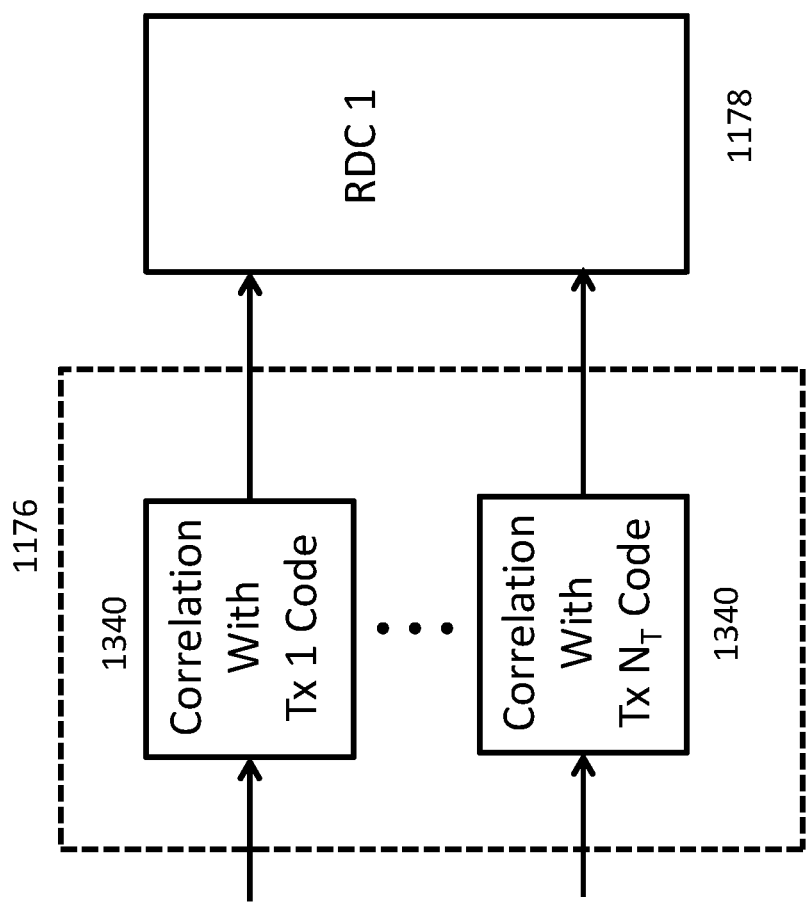

FIGS. 13A and 13B illustrate the radar system architecture with multiple receivers. FIG. 13A illustrates one or more antennas 1300, followed by a switch 1310, followed by $N_T$ receivers, that is followed by memory called radar data cube 1 (RDC1). The number of receivers 1320 may be different than the number of antennas 1300. For example, a system might have 16 antennas 1300 but only 8 receivers 1320. In this case, 8 of the antennas 1300 are not actually connected to a receiver 1320. The switch 1310 allows for any of the antennas 1300 to be connected to any of the receivers 1320. The radar data cube (1330) stores outputs of each receiver 1320. The outputs are the correlations at a particular delay (range). One dimension of the radar data cube 1330 is the range or delay, one dimension is the virtual radar (transmitter and receiver code), and one dimension corresponds to the sequence of complex correlator samples needed to calculate the velocity. For example, a receiver 1320 might correlate with one (or more) delays. The sequence complex correlation values will be stored in RDC1 (1330). Each of the receivers 1320 in FIG. 13A will have an analog front end, an analog-to-digital converter, and a digital front end. The digital front end will, besides providing interference mitigation, perform correlations with the spreading codes of different transmitters. FIG. 13B illustrates an implementation of the correlator block (1176) of FIG. 11c. In FIG. 13B there are correlations performed with different spreading codes corresponding to different transmitters. The correlations can be done in different fashion, such as with a matched filter that provides correlations with different delays. An FFT approach can also be used whereby the input is transformed to the frequency domain, as is the code. Then, multiplication followed by an inverse FFT operation is performed. Each of these produces outputs for multiple delays. Finally, the correlation with a particular transmitter (1340) can be accomplished with a multiply and sum operation where the product of the input signal and a particular delay of the transmitted spreading code is generated and then summed over some window of time. This would be repeated for various delays of the transmitted spreading code and would constitute one of the correlations with TX code blocks (1340) in the receiver.

Self-Interference Mitigation

One aspect of this invention is self-interference cancellation. Self-interference refers to the effect of the signal from one transmitter on the receiver/correlator matched to a second transmitter. If there are multiple transmitters generating transmitted signals simultaneously there will be interference from transmitters to correlators matched to different transmitters. While an exemplary two transmitters and two receivers are discussed, it will be clear how to extend the technique to more than two transmitters and two receivers.

Consider a spreading code for each transmitter that is an m-sequence of length 127. There are 18 different such m-sequences of that length and there is a group of 6 that form a set of preferred pairs in that the periodic cross correlation function between any of the pairs takes on the values 15, −1 and −17. The (periodic) autocorrelation is 127 at zero shift and −1 at all other shifts. Consider transmitting just one sequence from one transmitter and observing the output of one of the receivers. The receiver uses a filter that is matched to the signal of the first transmitter as well as a filter that is matched to the signal of the second transmitter. The receiver will have two outputs. The output of the receiver filter that is matched to the second code but due to the first transmitted signal can be used to determine the interference that will occur from the second transmitter to a receiver matched to that second transmitter when both the first and second transmitter signals are also transmitted. Once the output of a filter matched to the second transmitter due to the signal from the first transmitter is known at a receiver, this can be subtracted from the matched filter output that contains an output due to each of the transmitted signals. By repeating this operation with only the second transmitter actually transmitting a signal, the two-input, two-output response of the channel can be determined. Similar procedure will also work for multiple transmitters ($N_T$) and multiple receivers ($N_R$).

The operation occurs in several phases, illustrated here for the case of two transmitting antennas and two receiving antennas. In phase one, only transmitter one transmits a signal. This transmitted signal is received by both of the receivers. Each receiver processes the received signal with two matched filters. One filter is matched to the signal of transmitter one, and the another filter (filter two) is matched to the signal of transmitter two. Note that transmitter two is not sending a signal in phase one. In this way, each receiver of the pair of receivers can determine the effect of transmitter one's signal on the filter matched to the signal of transmitter two.

Figure 14:
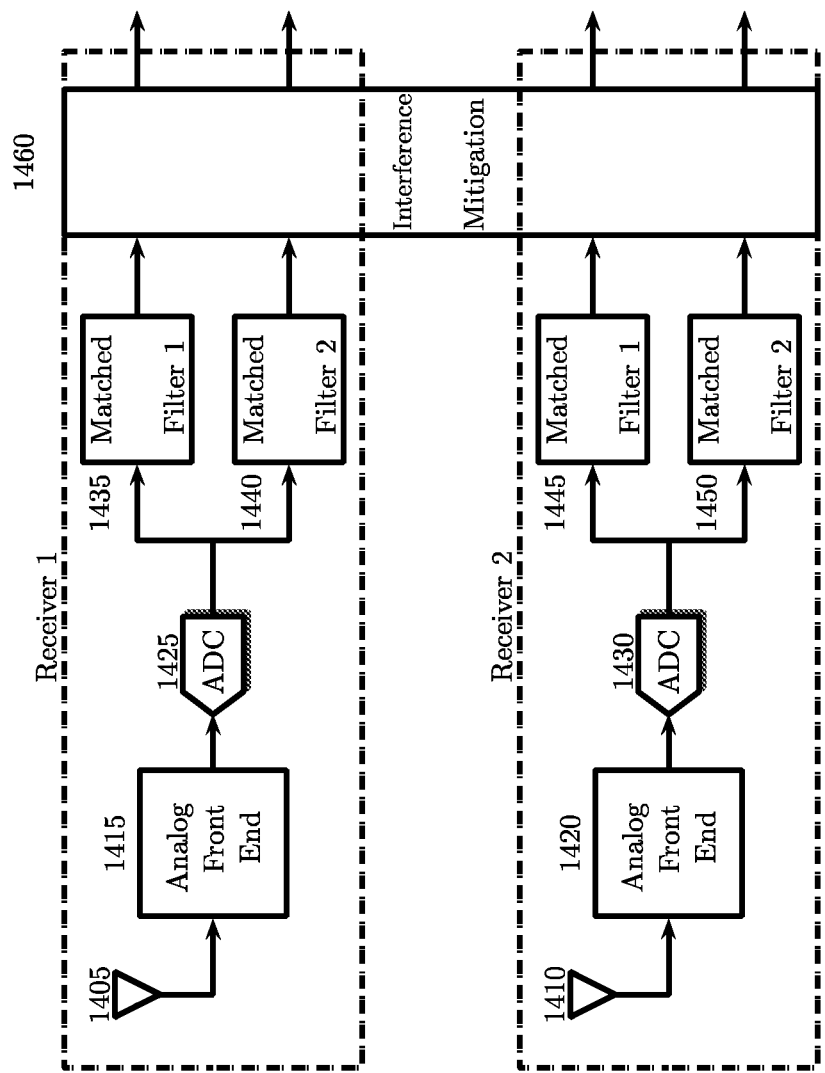
FIG. 14 is a block diagram of an exemplary correlation block for a receiver of a radar system in accordance with the present invention.
Figure 15:
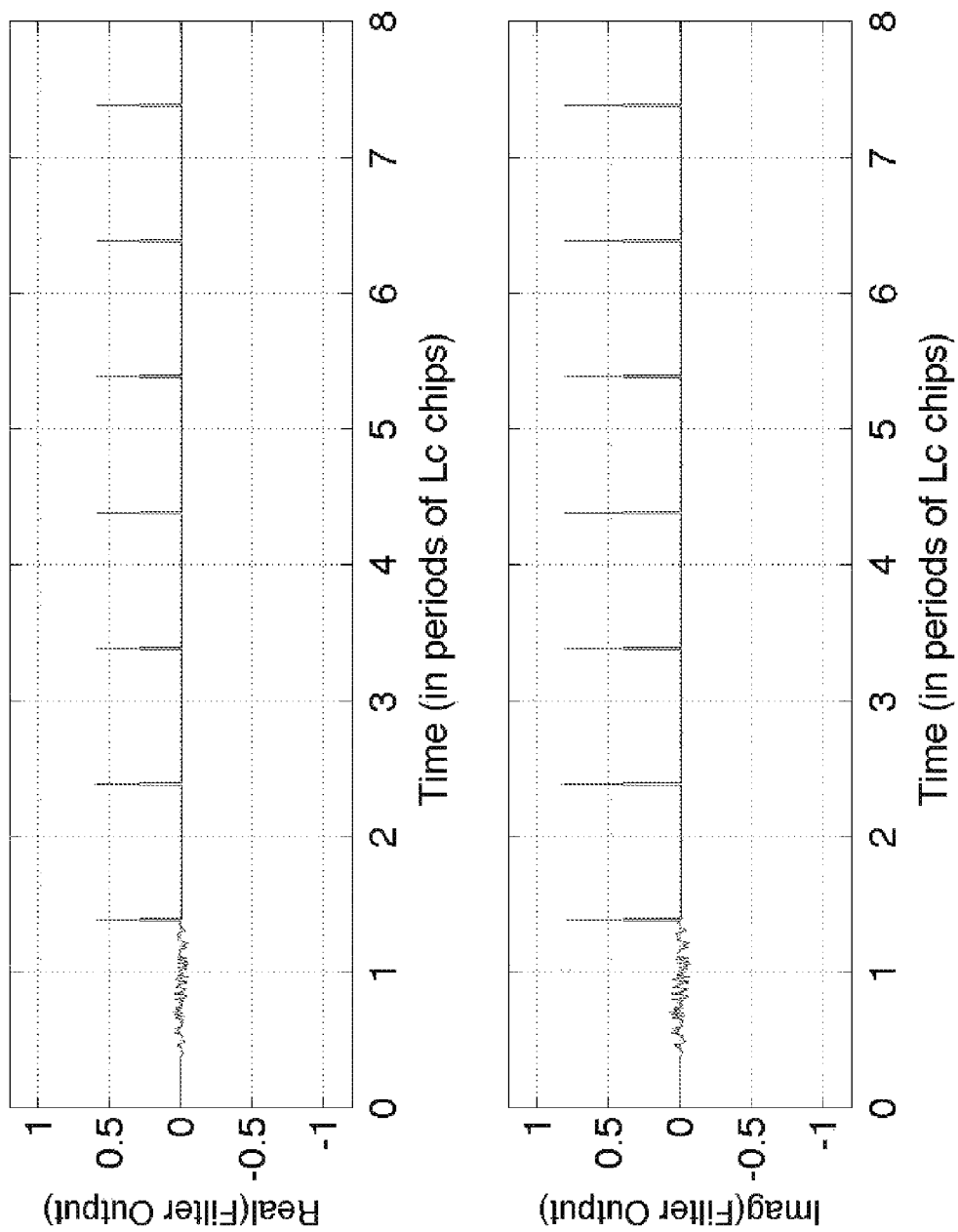
FIGS. 15-23 show pairs of graphs illustrating real and imaginary filter outputs over time in accordance with the present invention.
Figure 16:
Figure 17:
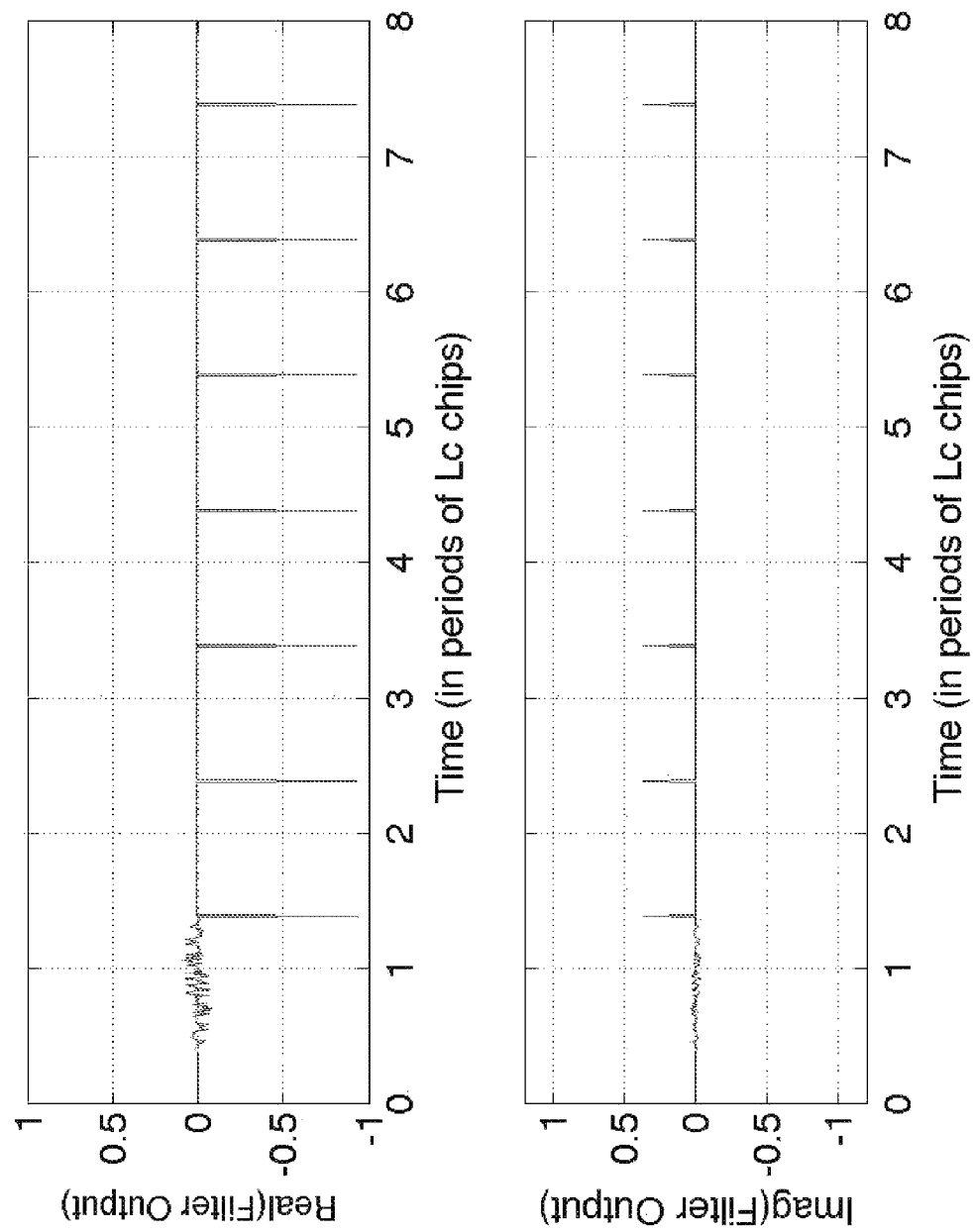
Figure 18:
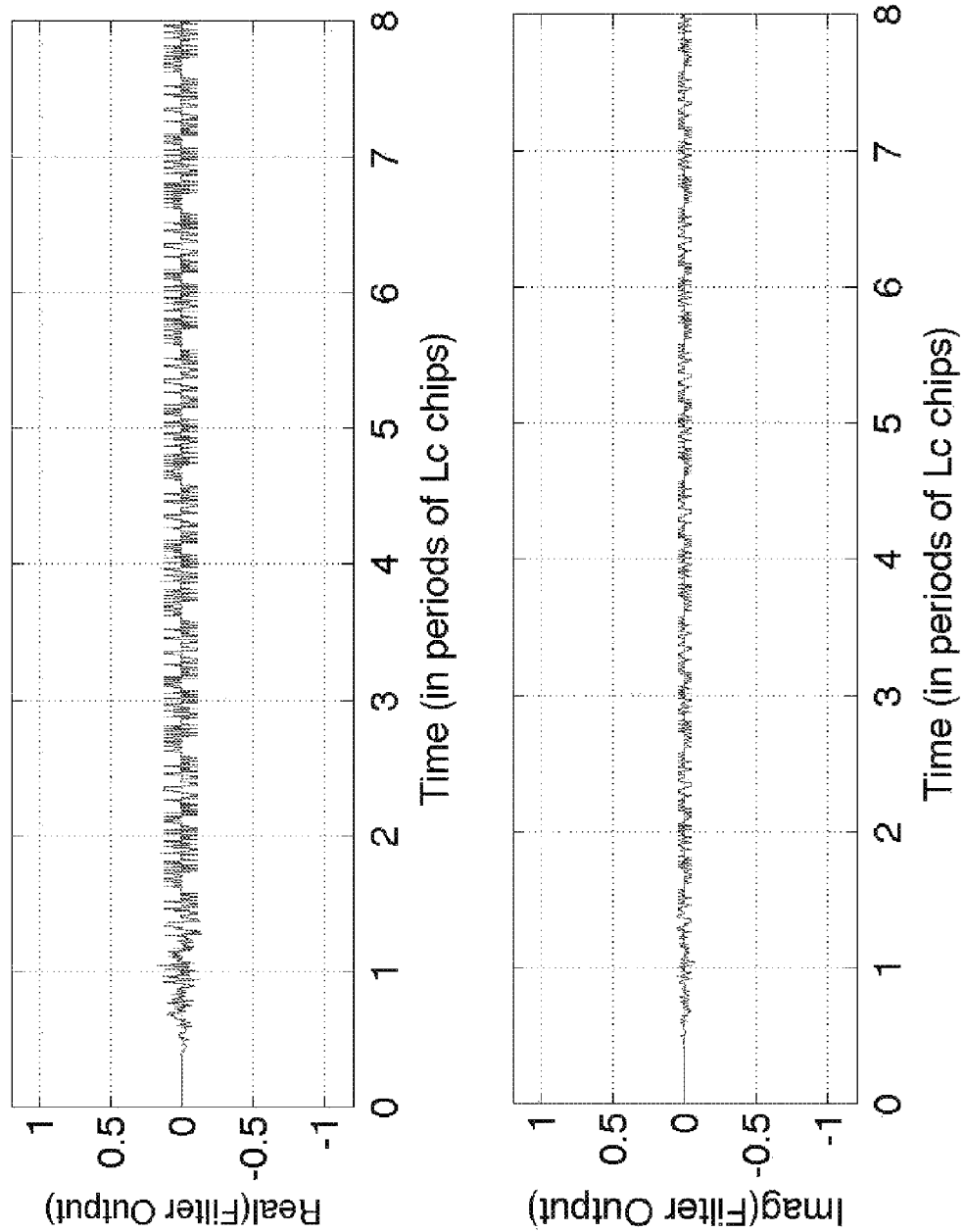

In an aspect of the present invention, each transmitter uses a different m-sequence of length 127 and repeats that sequence at least 8 times. An assumption is made that there is just one transmitter active transmitting a signal and a single target with a range delay of 50 chips. There are four matched filters; two for each antenna. There are two matched filters for antenna one (1435, 1440). One filter is matched to transmitter one and one filter is matched to transmitter two. Similarly for receiver antenna two there are two matched filters (1445, 1450). This is illustrated in FIG. 14. There is also an interference mitigation processor 1460. As discussed herein, at this time only one of the two transmitters is actually transmitting a signal. The output of the filter matched to the signal from transmitter one, at antenna one, is illustrated in FIG. 15 with the real part illustrated in the top part FIG. 15, and the imaginary part illustrated in the lower part of FIG. 15. Here, the output has been normalized to have a possible peak output of 1 (in the absence of a phase change). Part of the signal is received in the in-phase component (or I-component or real part) and part of the signal is received in the quadrature component (or Q-component or imaginary part) because of a phase shift that occurs between the transmitted signal and the received signal. The overall signal is a complex signal. The phase shift is due to the propagation delay and the reflection from the target. In this example, the signal is repeated eight times and as such, there are eight times at which the matched filter outputs have a peak. The output of the filter matched to signal two at antenna one is illustrated in FIG. 16. However, transmitter two is not active, so the output is the effect of transmitter one's signal on the filter matched to the signal from transmitter two. FIG. 17 illustrates the output of the filter matched to signal one from antenna two. The only difference between this output and that of the filter also matched to signal one from antenna one is the phase. That is, the relationship between the in-phase or I component and the quadrature-phase or Q component. The time difference is much smaller than a chip duration so the peaks occur at essentially the same time at the output of the matched filter. FIG. 18 illustrates the output due to signal one on the filter matched to signal two from antenna two. Note that receiver two can simultaneously process the signal from transmitter one using the spreading code of transmitter one and the spreading code of each of the other transmitters using multiple matched filters (or correlators or FFT processors). As such, receiver two can determine the effect of the signal of transmitter one on the processing corresponding to the signal of transmitter two and other transmitters. That is, receiver two knows the result of processing the received signal from transmitter one with a filter matched to the signal from transmitter two. Knowledge of this output can be used to cancel the interference when transmitter two is also actively transmitting.

Figure 19:
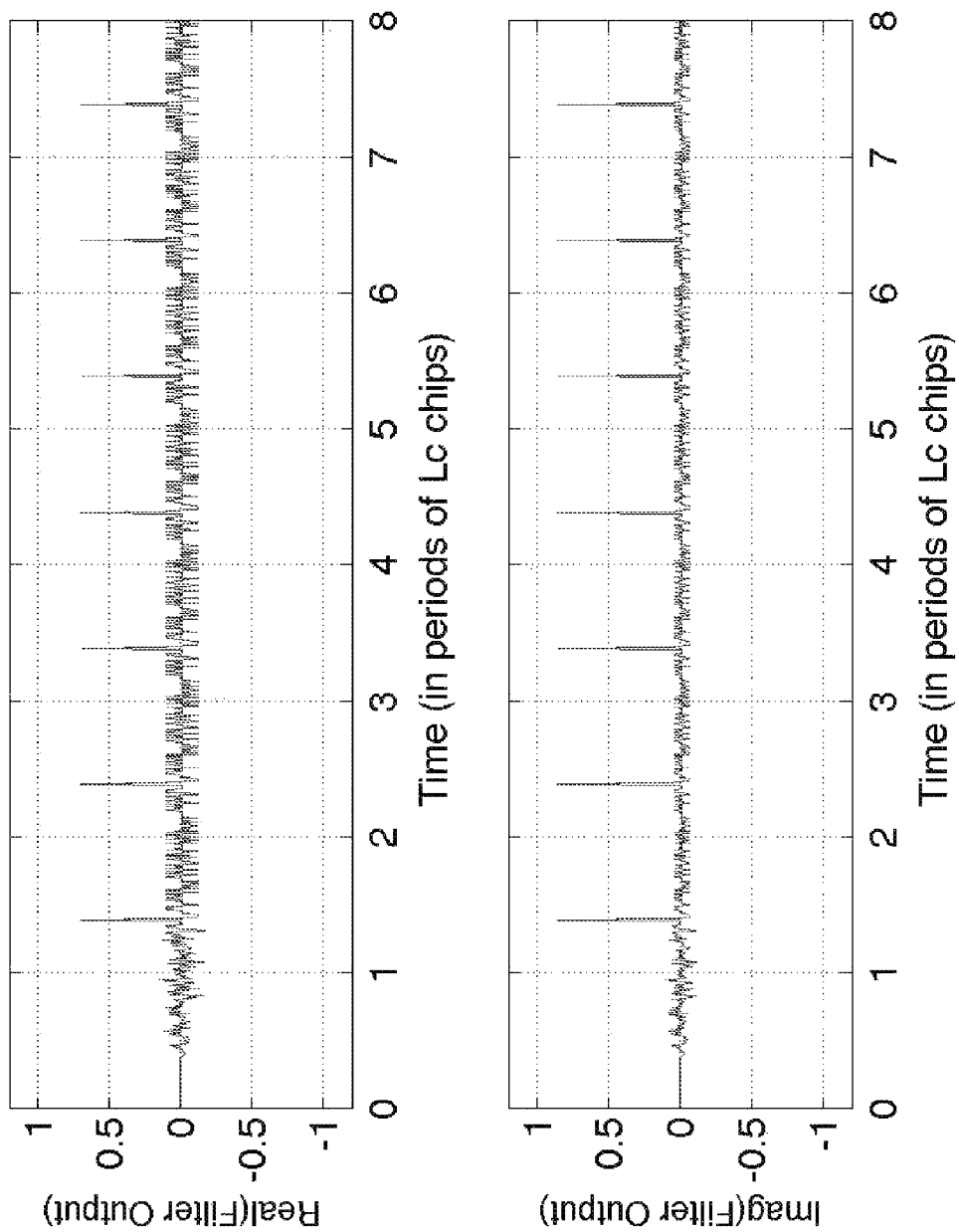
Figure 20:
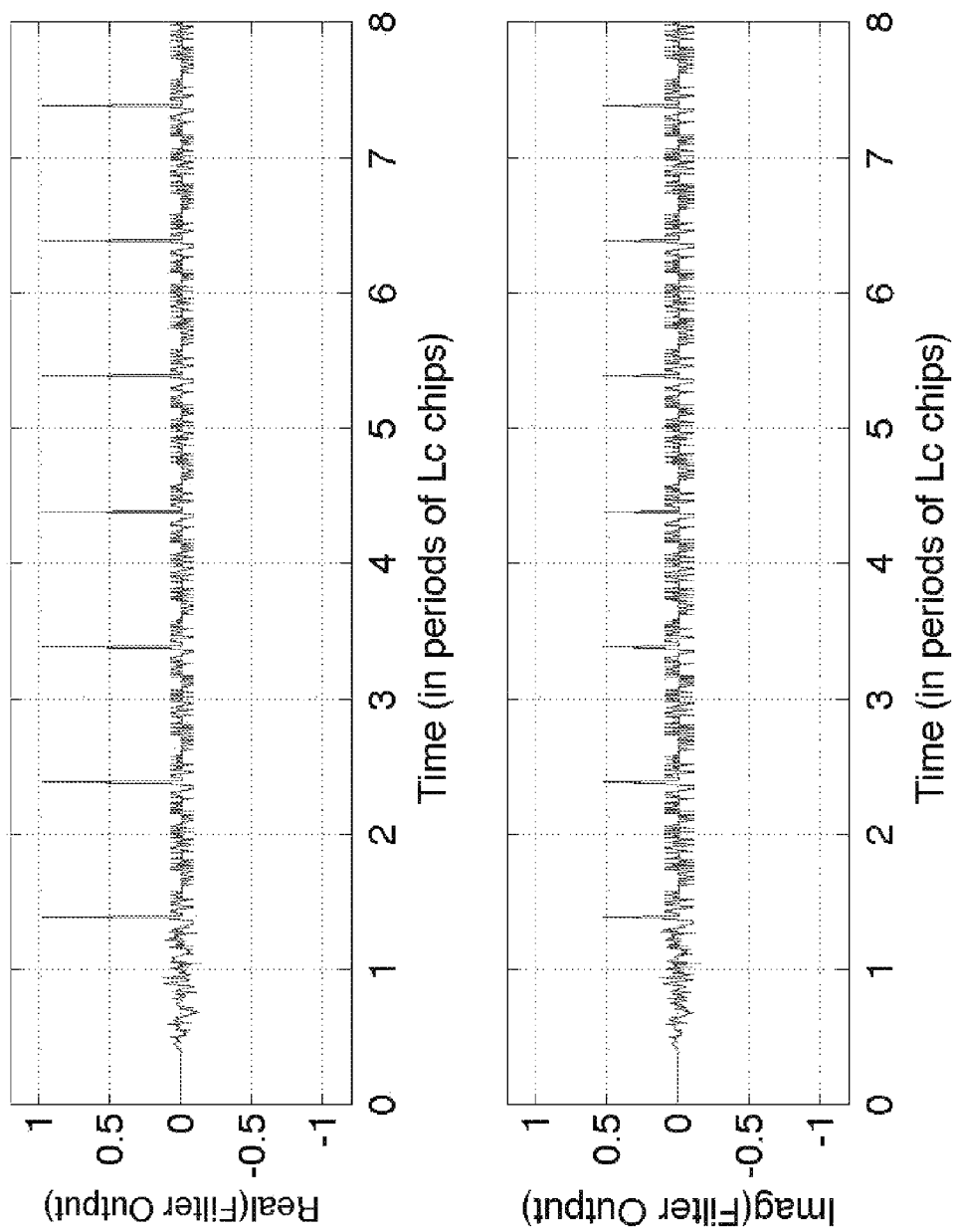
Figure 21:
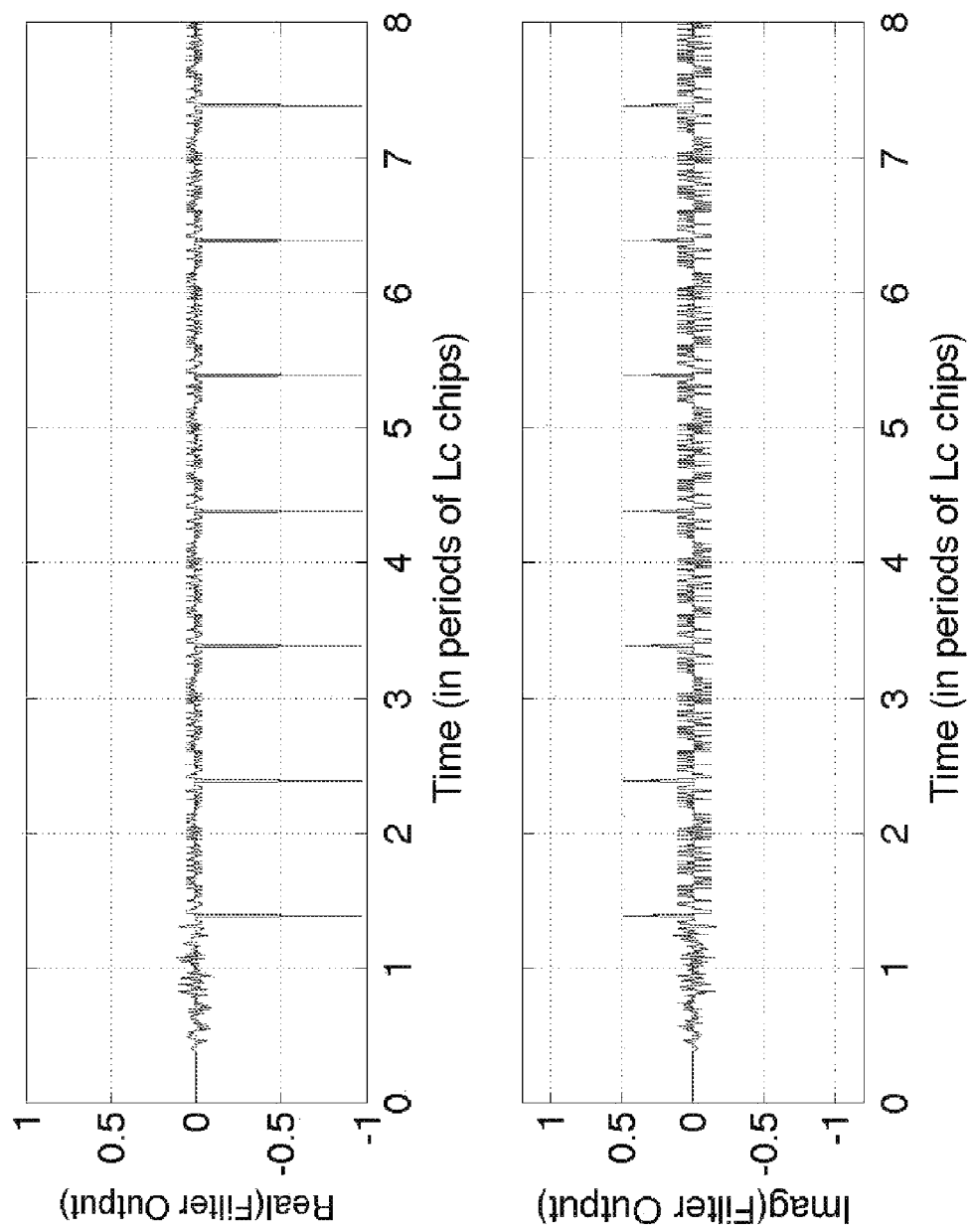
Figure 22:
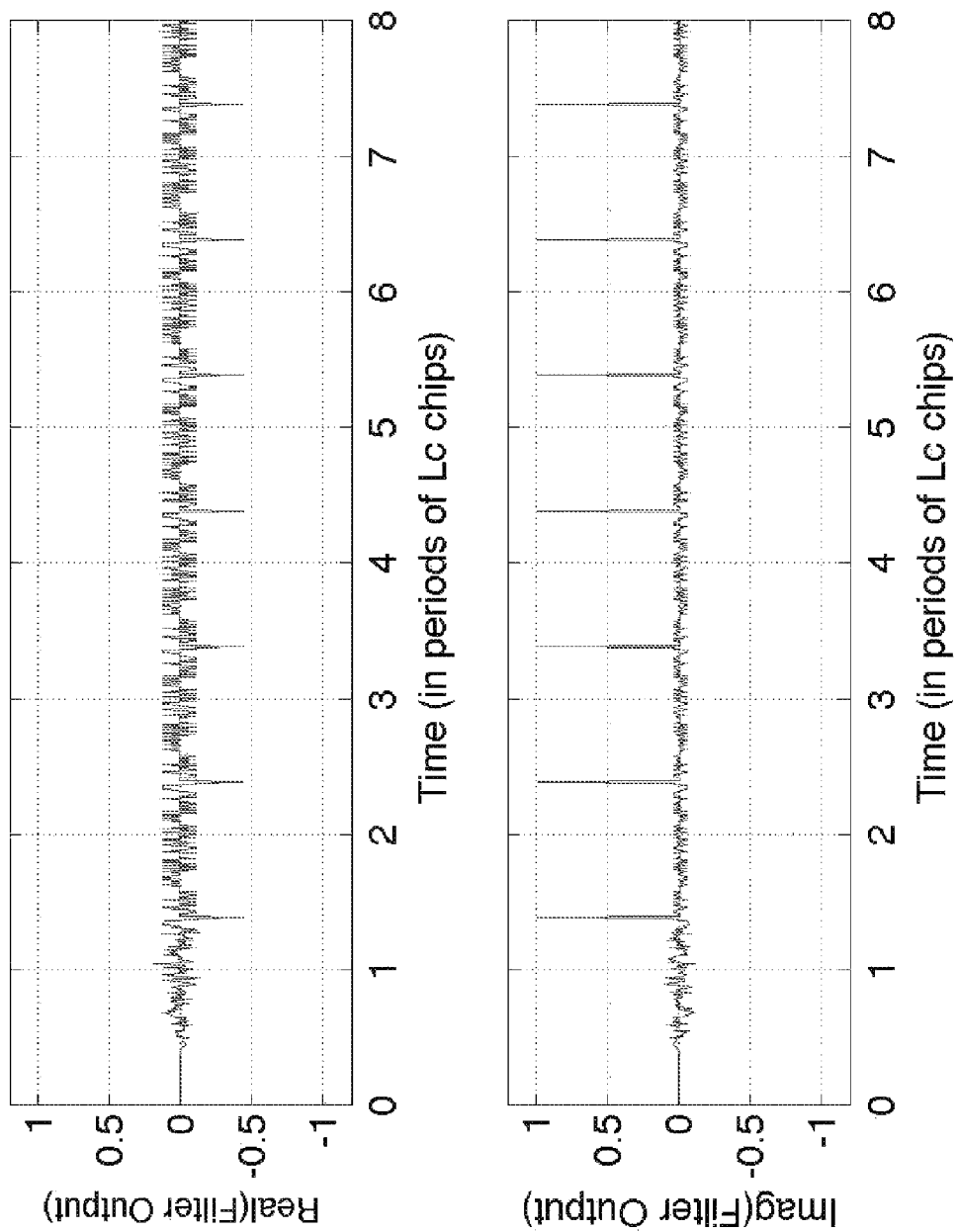

When transmitter one and transmitter two are simultaneously transmitting there will often be self-interference. FIGS. 19-22 illustrate the corresponding outputs when there are two transmitting antennas. The output of antenna one (1405) is provided (after mixing down to baseband) to matched filter one (1435). This output will have some component due to transmitter two. FIG. 19 shows the output of the filter (1435) matched to the code from transmitter one connected to antenna one. FIG. 20 shows the output of the filter (1440) matched to the code from transmitter two connected to antenna one. Similarly for FIGS. 21 and 22 showing the outputs of the filters connected to antenna two. The problem is that the self-interference can mask targets at a larger distance that have smaller received power. By controlling which antennas are transmitting at a given time the interference between signals can be estimated and mitigated.

The process of transmission (and self-interference cancellation) consists of several exemplary steps or phases. These steps do not have to be performed necessarily in any particular order. In step one, the only transmission is from transmitter one. The transmitted signal is a certain number of repeats of one period of the signal. So, if the period of the signal used by each transmitter is $L_C T_C$, then this could be transmitted M times for a total transmission time of $ML_C T_C$. In step two or phase two, only the second transmitter is activated. The signal transmitted is again a repeat of the signal of period $L_C T_C$ for a total transmission time of $ML_C T_C$. This is repeated for each transmitter. Once all transmitters have been individually activated and the receiver knows the channel response from each of the receivers, the next step or phase is interference mitigation.

Note, that this step or phase can also be applied when every signal has a different period. It can also be applied to only a subset of the transmitters or receivers.

Figure 23:
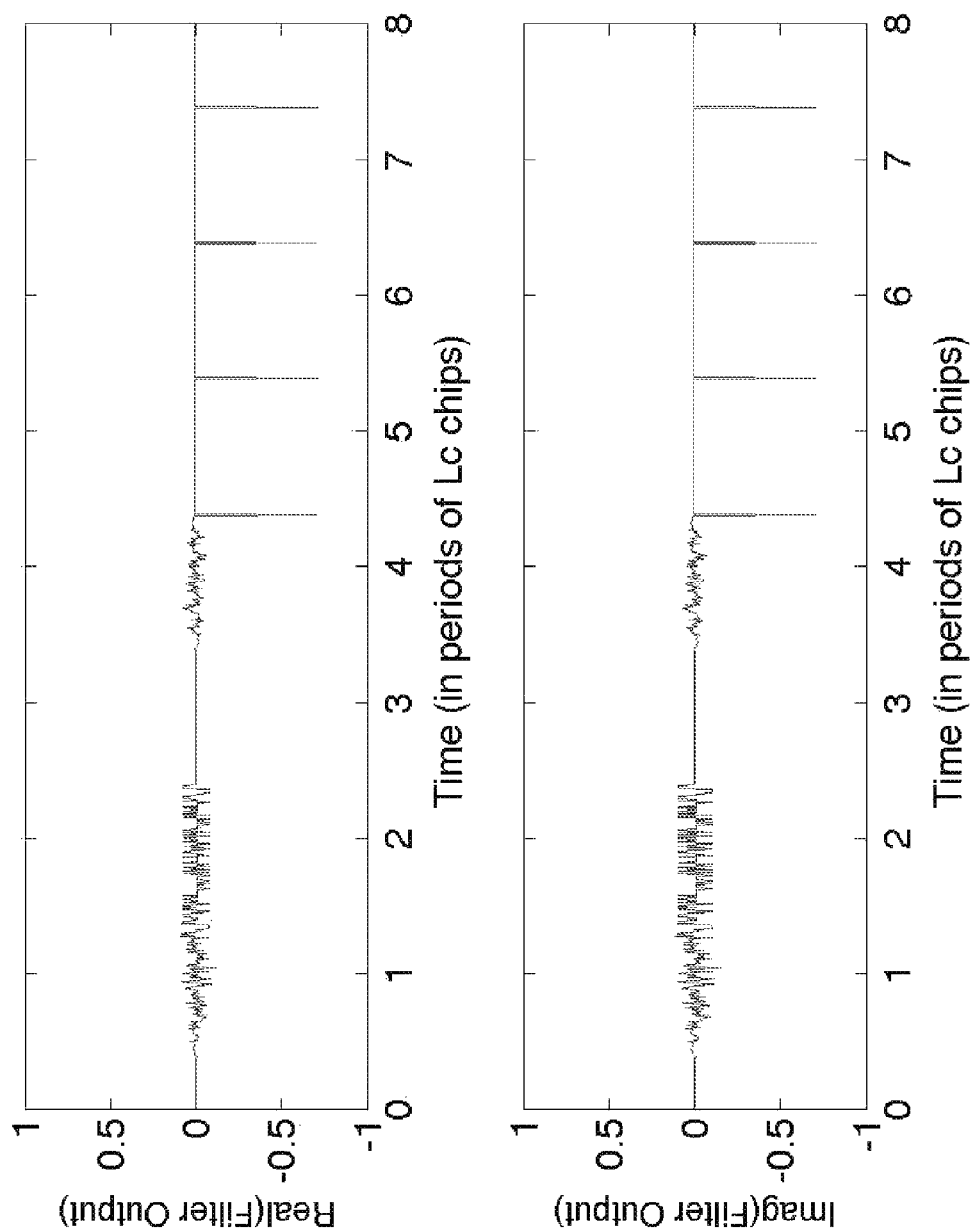

Consider again the case of just two transmitters. The signal from transmitter one has been estimated at the output of receiver two, and has been removed after the estimation has been completed. The output of the receiver matched to the signal of transmitter two is illustrated in FIG. 23. Here, the interference at antenna two due to signal one on the output of the filter matched to signal two is estimated from the initial transmission with only transmitter one active and then subtracted from the filter matched to signal two.

The control of the radar transmitters and receivers to minimize the self-generated interference by estimating the self-interference with only a single transmitter and then utilizing that to mitigate the interference with multiple transmitters is one aspect of this invention. A technique of recording the level of interference from one transmitter and then using that to subtract out the interference when another transmitter is active applies to periodic (repeating) codes. However, a method of measuring the channel response and then generating the interference from the known spreading codes is an approach that performs the same way. However, this technique can be applied to non-periodic spreading codes as well.

Another method of reducing interference is to combine a shorter code with a Hadamard outer code. The Hadamard outer code is a set of orthogonal codewords. This means that there would be no interference from the signal of one transmitter to a receiver matched to a second code at a particular sampling time. That is, a target at a certain distance will produce a peak in the matched filter outputs. At the time of the peak there will not be any interference from signals of other transmitters. However, this does not eliminate the interference that can occur at other times. Nonetheless, it does provide additional interference mitigation. The interference mitigation discussed herein can be combined with the Hadamard code to provide multiple mitigation techniques. The use of Hadamard codes for interference mitigation are discussed in U.S. patent application Ser. No. 15/416,219, filed Jan. 26, 2017, which is hereby incorporated by reference herein in its entirety.

Another type of interference is discussed in U.S. provisional patent application, Ser. No. 62/327,003, filed Apr. 25, 2016, which is hereby incorporated by reference herein in its entirety. One type of interference considered is from "spill over" from the transmitter to the receiver. This is the signal picked up by the receiver circuitry and antennas from the transmitter circuitry and antenna (e.g., antenna coupling). Another type of interference considered is interference from very close targets such as a fascia or bumper in an automotive application. This interference is quite large. The mitigation technique described here can be implemented with a controller programmed to adapt the receiver to this type of self-interference. Spillover from transmitter to receiver on chip, coupling between antennas, other reflection from fascia/other targets can de-sense the receiver by overloading the receiver chain due to self-interference. The present invention provides a method for a phase modulated continuous wave (PMCW) system using the advanced temporal knowledge of the code(s) to be transmitted in combination with a bank of digital finite impulse response (FIR) filters to generate complementary signal(s) to the self-interference noise, next convert them to an analog signal with a digital to analog converter (DAC) and then subtract the complementary signals at one or more points in the analog receive chain prior to de-sensing the receiver. This method has shown 20-40 dB of signal reduction in simulation. This significantly reduces or eliminates the impact of these self-interference signals on de-sensing the receiver variable gain amplifiers (VGA). The use of this technique is controlled by the controller described earlier.

A similar method may be used in the digital domain to recreate the digital version of the self-interference signal(s) with advanced temporal knowledge of the code(s) as inputs to an FIR filter bank and then digitally subtract the estimated interference signal in the digital domain prior to correlation and lowering the impact of these by another 20-40 dB. Further refinement of the self-interfering signal will enable larger cancelation.

One exemplary method of cancelling out self-interference is to generate a replica of each spreading code at the receiver. This signal is then used as an input to an FIR filter that will reconstruct the received signal corresponding to the transmitted signal of transmitter i. By just inverting this signal and adding it to the input of the filter matched to the j-th transmitted signal, the i-th transmitted signal will be automatically removed. By updating the taps of the FIR filter as the vehicle moves, the interference will be significantly reduced. Implementing the FIR filter can also be done in the frequency domain by taking the FFT of the replica of the spreading code of transmitter i, processing it (multiplying) with the FFT of the spreading code of transmitter j and then further multiplying it by the known channel characteristics. As such, the part of the received signal due to transmitter i can be recreated at the receiver attempting to process transmitter j's signal. Once recreated this signal can be used to cancel out the signal of transmitter i. Note that the generation of the correlation between the signal of transmitter i and that of transmitter j can be used at all the receivers but only needs to be generated once. The benefit of this approach is that codes that have good autocorrelation but potential poor cross correlation will not cause a problem with the system. As such a search for codes with good autocorrelation (such as m-sequences, APAS sequences) would be sufficient.

The invention is a method of using MIMO radar in which the transmitted signal adapts based on the current knowledge of targets. At turn on, with no knowledge of the targets, the radar will use one antenna at a time (SIMO mode). A sequence with excellent autocorrelation properties (e.g., m-sequences, APAS sequences, and Golay sequences) is employed initially by a single transmitter. The recovered signal is processed to determine a coarse range estimate and possible a Doppler estimate for each target. This might involve a combination of coherent integration and non-coherent integration depending on the range of Dopplers anticipated. Each of the individual antennas are sequentially used. After each of the transmitters has been used once and coarse knowledge of range is available then the system switches to MIMO mode in which all transmitters are used simultaneously. In this mode sequences with good cross correlation are utilized. The non-ideal properties of the autocorrelation of these sequences, can be neutralized by interference cancellation techniques. One embodiment uses m-sequences for the SIMO mode and uses a combination of m-sequences and Hadamard codes for the MIMO mode. Another embodiment uses APAS codes for the initial sequences and a combination of Hadamard codes and APAS codes for the MIMO mode. A third embodiment uses Golay codes (with QPSK) for the SIMO mode and Hadamard codes for the MIMO mode. Different interference cancellation techniques can be employed for the MIMO mode to eliminate (or reduce) the interference from side lobes of the autocorrelation of the sequences.

The method here is not limited to any particular parameter values but as one of skill in the art would understand is applicable to a wide variety of parameter values.

Therefore, a radar sensing system is provided with flexible transmission and reception parameters, such that the radar sensing system can operate under a variety of environments and with a variety of objective functions to optimize the system with respect to a given objective function. The invention accomplishes better performance by operating the system in different modes. In an SIMO mode, interference can be estimated (while simultaneously obtaining range information for near targets). In the MIMO mode, interference can be mitigated and far targets can be estimated. In addition, the length of the spreading codes can be changed adaptively. Better performance is also obtained by changing the receiver processing including the receiving antennas, interference mitigation techniques to be employed, and a length of time of the signal used to process a received signal to determine range.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for mitigating self-interference in a radar system for a vehicle, the method comprising:
    providing a radar system comprising (i) a plurality of transmitters configured for installation and use on a vehicle and configured to transmit radio signals, and (ii) a plurality of receivers configured for installation and use on the vehicle and configured to receive radio signals that include the transmitted radio signals reflected from objects in the environment;
    transmitting radio signals with only a first transmitter of the plurality of transmitters and receiving radio signals transmitted from the first transmitter with at least one receiver of the plurality of receivers;
    correlating the received radio signals with each receiver of the at least one receiver to estimate interference that the first transmitter will represent at each receiver of the at least one receiver; and
    mitigating at each receiver of the at least one receiver the estimated interference that is due to interfering radio signals transmitted by the first transmitter.

2. The method of claim 1 further comprising:
    transmitting radio signals with only a second transmitter of the plurality of transmitters and receiving radio signals transmitted from the second transmitter with the at least one receiver of the plurality of receivers;
    correlating the received radio signals with each receiver of the at least one receiver to estimate interference that the second transmitter will represent at each receiver of the at least one receiver; and
    mitigating at each receiver of the at least one receiver the estimated interference that is due to interfering radio signals transmitted by the first and second transmitters.

3. The method of claim 2, wherein transmitting with a first transmitter comprises the first transmitter transmitting with a single antenna.

4. The method of claim 3, wherein transmitting with a second transmitter comprises the second transmitter transmitting with a single antenna that is different from the single antenna used by the first transmitter.

5. The method of claim 1, wherein each transmitter of the plurality of transmitters is configured to phase modulate the transmitted radio signals using a unique spreading code.

6. The method of claim 5, wherein transmitting with only a first transmitter comprises further modulating the transmitted radio signals with spreading codes selected with known autocorrelation properties.

7. The method of claim 6, wherein the estimated effect of the interference from a particular transmitter on a particular receiver that correlates with a different set of spreading codes is used to mitigate the interference from the particular transmitter at the particular receiver.

8. The method of claim 6, wherein a length of the spreading codes is selected based upon an interference level.

9. The method of claim 6, wherein the spreading codes are binary codes, and comprise one of m-sequences, APAS sequences, Golay sequences, Frank-Zadoff-Chu sequences, and Hadamard codes.

10. The method of claim 1, wherein transmitting radio signals with only a first transmitter of the plurality of transmitters comprises transmitting for a first period of time, and wherein transmitting radio signals with only a second transmitter of the plurality of transmitters comprises transmitting for a second period of time.

11. The method of claim 1, wherein radio signals transmitted from only the first transmitter are received with each receiver of the plurality of receivers.

12. A radar sensing system for a vehicle, the radar sensing system comprising:
   a transmit pipeline configured for installation and use on a vehicle, wherein the transmit pipeline comprises a plurality of transmitters configured to transmit radio signals;
   a receive pipeline configured for installation and use on the vehicle, wherein the receive pipeline comprises a plurality of receivers configured to receive radio signals that include the transmitted radio signals reflected from objects in the environment;
   a controller configured to direct during a first operational mode only a first transmitter of the plurality of transmitters to transmit, wherein radio signals transmitted from only the first transmitter are received by at least one receiver of the plurality of receivers;
   wherein, during the first operational mode, each receiver of the at least one receiver is configured to correlate the received radio signals to estimate interference that the first transmitter will represent at each receiver of the at least one receiver; and
   wherein, during a second operational mode, each receiver of the at least one receiver is configured to mitigate the estimated interference that is due to the interfering radio signals transmitted by the first transmitter.

13. The radar sensing system of claim 12, wherein during the first operational mode, the controller is configured to select which receivers of the plurality of receivers receive the transmitted radio signals.

14. The radar sensing system of claim 12, wherein during the first operational mode, the controller is configured to direct only a second transmitter of the plurality of transmitters to transmit, and wherein radio signals transmitted from only the second transmitter are received by the at least one receiver of the plurality of receivers, and wherein, during the first operational mode, each receiver of the at least one receiver is configured to correlate the received radio signals to estimate interference that the second transmitter will represent at each receiver of the at least one receiver, and wherein, during the second operational mode, each receiver of the at least one receiver is configured to mitigate the estimated interference that is due to the interfering radio signals transmitted by the first and second transmitters.

15. The radar sensing system of claim 14, wherein, during the first operational mode, the first transmitter transmits with a single antenna.

16. The radar sensing system of claim 15, wherein, during the first operational mode, the second transmitter transmits with a different single antenna.

17. The radar sensing system of claim 12, wherein each transmitter of the plurality of transmitters is configured to phase modulate the transmitted radio signals using a unique spreading code.

18. The radar sensing system of claim 17, wherein the plurality of transmitters are configured to modulate the transmitted radio signals with spreading codes selected with known autocorrelation properties.

19. The radar sensing system of claim 18, wherein the estimated effect of the interference from a particular transmitter on a particular receiver that correlates with a different set of spreading codes is used to mitigate the interference from the particular transmitter at the particular receiver.

20. The radar sensing system of claim 19, wherein a length of the spreading codes is selected based upon an interference level, and wherein the spreading codes are binary codes, and comprise one of m-sequences, APAS sequences, Golay sequences, Frank-Zadoff-Chu sequences, and Hadamard codes.

21. The radar sensing system of claim 12, wherein transmitting radio signals with only a first transmitter of the plurality of transmitters comprises transmitting for a first period of time, and wherein transmitting radio signals with only a second transmitter of the plurality of transmitters comprises transmitting for a second period of time.

22. The radar sensing system of claim 12, wherein radio signals transmitted from the first transmitter are received with each receiver of the plurality of receivers.

23. A radar sensing system for a vehicle, the radar sensing system comprising:
   a plurality of transmitters configured for installation and use on a vehicle and configured to transmit radio signals;
   a plurality of receivers configured for installation and use on the vehicle and configured to receive radio signals that include the transmitted radio signals reflected from objects in the environment;
   a controller configured to direct during a first operational mode the plurality of transmitters and the plurality of receivers to operate in a single-input, multiple-output mode, wherein, during the first operational mode, at least a first portion of transmitters of the plurality of transmitters individually transmits in sequence, each during a separate period of time, and wherein the sequence of transmitted radio signals is received by a first portion of receivers of the plurality of receivers;
   wherein, during the first operational mode, each receiver of the first portion of receivers is configured to correlate the received radio signals to estimate interference that each individual transmitter of the first portion of transmitters will represent at each receiver of the first portion of receivers; and
   wherein the controller is configured to direct during a second operational mode the plurality of transmitters and the plurality of receivers to operate in a multiple-input, multiple-output mode, wherein, during the second operational mode, each receiver of the first portion of receivers is configured to mitigate the estimated interference that is due to the interfering radio signals transmitted by each individual transmitter of the first portion of transmitters.

24. The radar sensing system of claim 23, wherein, during the first operational mode, the controller is configured to select the first portion of transmitters and the first portion of receivers.

25. The radar sensing system of claim 23, wherein each transmitter of the plurality of transmitters transmits with a separate antenna.

26. The radar sensing system of claim 23, wherein each transmitter of the plurality of transmitters is configured to phase modulate the transmitted radio signals using a unique spreading code.

27. The radar sensing system of claim 26, wherein, during the first operational mode, the controller is configured to direct the plurality of transmitters to modulate the transmitted radio signals with spreading codes selected with known autocorrelation properties, and wherein, during the second operational mode, the controller is configured to direct the plurality of transmitters to modulate the transmitted radio signals with spreading codes selected with known cross correlation properties.

28. The radar sensing system of claim 26, wherein the controller is configured to select a length of the spreading codes based upon a determined interference level, and wherein the spreading codes are binary codes, and comprise one of m-sequences, APAS sequences, Golay sequences, Frank-Zadoff-Chu sequences, and Hadamard codes.

29. The radar sensing system of claim 26, wherein an estimated effect of the interference from a particular transmitter on a particular receiver that correlates with a different set of spreading codes is used to mitigate the interference from the particular transmitter.

30. The radar sensing system of claim 26, wherein each receiver of the plurality of receivers comprises a filter for each transmitter of the plurality of transmitters, and wherein each filter correlates to a corresponding transmitter, and wherein a particular receiver's filter output for a corresponding transmitter and for a transmitter currently transmitting are used to identify and characterize self-interference from that particular transmitter currently transmitting for the particular receiver.

\* \* \* \* \*